(12) United States Patent
Whitmore, Jr. et al.

(10) Patent No.: US 11,609,349 B2
(45) Date of Patent: Mar. 21, 2023

(54) DETERMINING PROPERTIES OF A SUBTERRANEAN FORMATION USING AN ACOUSTIC WAVE EQUATION WITH A REFLECTIVITY PARAMETERIZATION

(71) Applicant: PGS Geophysical AS, Oslo (NO)

(72) Inventors: Norman Daniel Whitmore, Jr., Houston, TX (US); Jaime Ramos-Martinez, Katy, TX (US); Sean Crawley, Katy, TX (US); Yang Yang, Houston, TX (US); Alejandro Antonio Valenciano Mavilio, Bellaire, TX (US); Nizar Chemingui, Houston, TX (US)

(73) Assignee: PGS Geophysical AS, Oslo (NO)

( * ) Notice: Subject to any disclaimer, the term of this patent is extended or adjusted under 35 U.S.C. 154(b) by 131 days.

(21) Appl. No.: 17/060,763

(22) Filed: Oct. 1, 2020

(65) Prior Publication Data

US 2021/0103065 A1    Apr. 8, 2021

Related U.S. Application Data

(60) Provisional application No. 62/911,464, filed on Oct. 7, 2019.

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 2210/675* (2013.01)

(58) Field of Classification Search
CPC .............................. G01V 1/301; G01V 1/282
See application file for complete search history.

(56) References Cited

U.S. PATENT DOCUMENTS 10,436,927 B2 *  10/2019  Sun ........................ G01V 1/364
11,428,834 B2 *   8/2022  Ramos-Martinez ... G01V 1/201
2014/0301158 A1 * 10/2014  Zhang ...................... G01V 1/34
                                                              367/7

(Continued)

OTHER PUBLICATIONS

Ramos-Martinez, Jaime et al., "A robust FWI graduent for high-resolution velocity model building," SEG International Exposition and 86th Annual Meeting, 2016 SEG, pp. 1258-1262

(Continued)

*Primary Examiner* — Bryan Bui

(57) ABSTRACT

Methods and systems described herein are directed to determining properties of a subterranean formation using an acoustic wave-equation with a novel formulation in terms of a velocity model and a reflectivity model of the subterranean formation. The acoustic wave equation may be used with full-waveform inversion to build high-resolution velocity and reflectivity models of a subterranean formation. The acoustic wave equation may be also used with least-squares reverse time migration in the image and space domains, to build a reflectivity model of the subterranean formation with enhanced resolution and amplitude fidelity. The velocity and reflectivity models of materials that form the subterranean formation reveal the structure and lithology of features of the subterranean formation and may reveal the presence of oil and natural gas reservoirs.

18 Claims, 14 Drawing Sheets

(56) References Cited

U.S. PATENT DOCUMENTS

2019/0187312 A1* 6/2019 Ramox-Martinez ........................ G01V 1/3843

OTHER PUBLICATIONS

Xu, S., et al., "W024 Full Waveform Inversion for Reflected Seismic Data," 74th EAGE Conference & Exhibition i incorporation SPE EUROPEC 2012, Copenhagen, Denmark, Jun. 4-7, 2012.
Whitmore, N.D. and Sean Crawley, "Applications of RTM inverse scattering imaging conditions," 2012 SEG, SEG Las Vegas 2012 Annual Meeting, pp. 1-6
Yu, Jianhua, et al., "Prestack migration deconvolution," 70th Annual International Meeting, Society of Explortion Geophysicists, Geophysics vol. 71 No 2 (Mar.-Apr. 2006), pp. S53-S62
Guitton, Antoine, "Amplitude and kinematic corrections of migrated images for nonunitary imaging operators," Geophysics, vol. 69, No. 4 (Jul.-Aug. 2004); pp. 1017-1024.
Tarantola, Albert, "Inversion of seismic reflection data in the acoustic approximation," Geophysics, vol. 49, No. 8 (Aug. 1984); pp. 1259-1266.

* cited by examiner

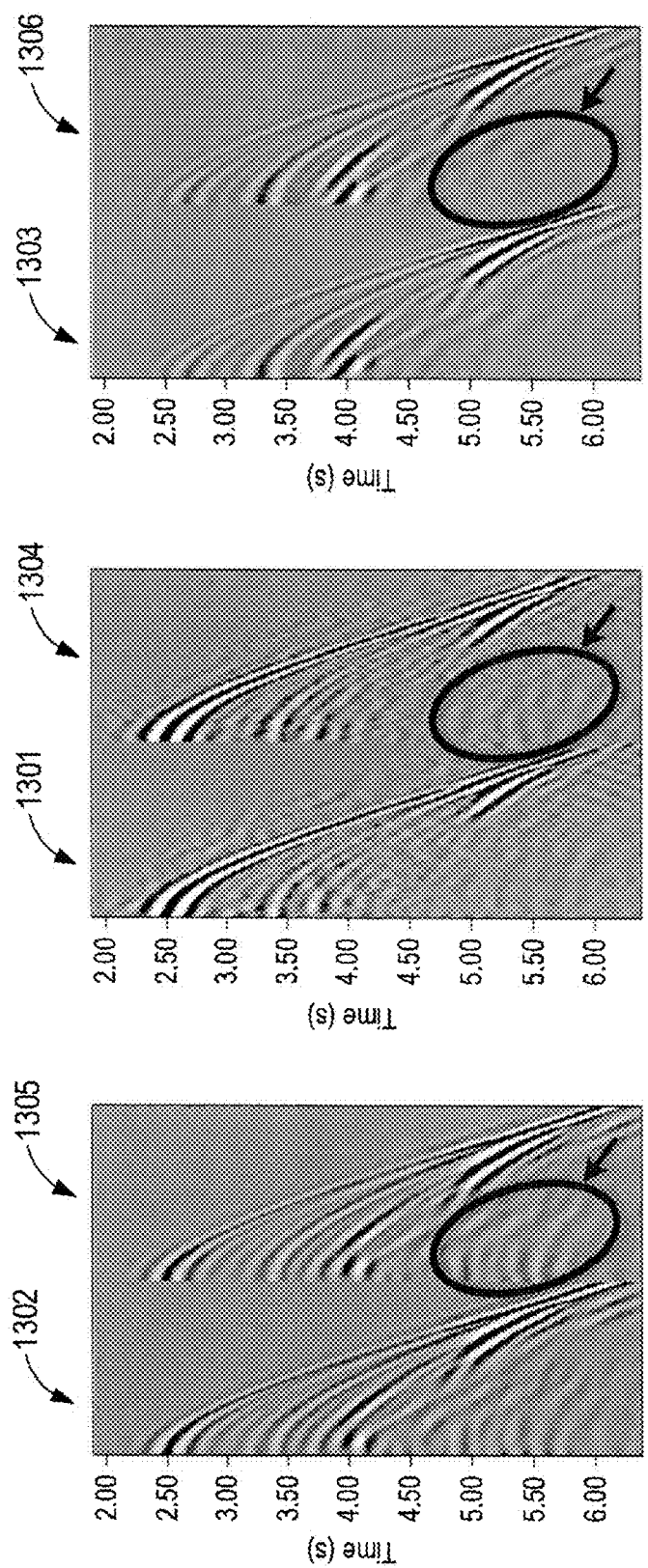

DETERMINING PROPERTIES OF A SUBTERRANEAN FORMATION USING AN ACOUSTIC WAVE EQUATION WITH A REFLECTIVITY PARAMETERIZATION

CROSS-REFERENCE TO RELATED APPLICATION

This application claims the benefit of Provisional Application 62/911,464, filed Oct. 7, 2019, which application is hereby incorporated by reference as if entirely set forth herein.

BACKGROUND

Marine seismology companies invest heavily in the development of marine seismic surveying equipment and seismic data processing techniques in order to obtain accurate, high-resolution images of subterranean formations located beneath a body of water. Such images are used, for example, to determine the structural features of the subterranean formations, to discover oil and natural gas reservoirs, and to monitor oil and natural gas reservoirs during production. A typical marine seismic survey is performed with one or more survey vessels that tow a seismic source and many streamers through the body of water. The survey vessel contains seismic acquisition equipment, such as navigation control, seismic source control, seismic receiver control, and recording equipment. A seismic source control controls activation of the one or more seismic sources at selected times or locations. A seismic source may be an impulsive source comprised of an array of air guns that are activated to produce impulses of acoustic energy. Alternatively, a seismic source may be a marine vibrator that emits acoustic energy over a longer time period. The acoustic energy generated by a seismic source spreads out in all directions. A portion of the acoustic energy travels down through the water and into a subterranean formation to propagate as sound waves within the subterranean formation. At each interface between different types of liquid, rock and sediment, a portion of the sound wave is refracted, a portion is transmitted, and another portion is reflected into the body of water to propagate as a reflected wavefield toward the water surface. The streamers are elongated spaced apart cable-like structures towed behind a survey vessel in the direction the survey vessel is traveling and are typically arranged substantially parallel to one another. Each streamer contains many seismic receivers or sensors that detect pressure and/or particle motion wavefields of the sound waves. The streamers collectively form a seismic data acquisition surface that records wavefields as seismic data in the recording equipment. Alternatively, a seismic data acquisition surface may be created by deploying the receivers at the bottom of the body of water and directly on or near the surface of the subterranean formation. The recorded pressure and or particle motion wavefields are processed to generate and display images of the subterranean formation, enabling geoscientist to identify potential oil and natural gas reservoirs and to monitor oil and natural gas reservoirs under production.

DESCRIPTION OF THE DRAWINGS

FIGS. 13A-13C show a comparison of seismic data obtained using the acoustic wave equation in Equation (7) with actual seismic data and seismic data obtained using an acoustic wave equation with a constant density model.

DETAILED DESCRIPTION

Figure 1A:
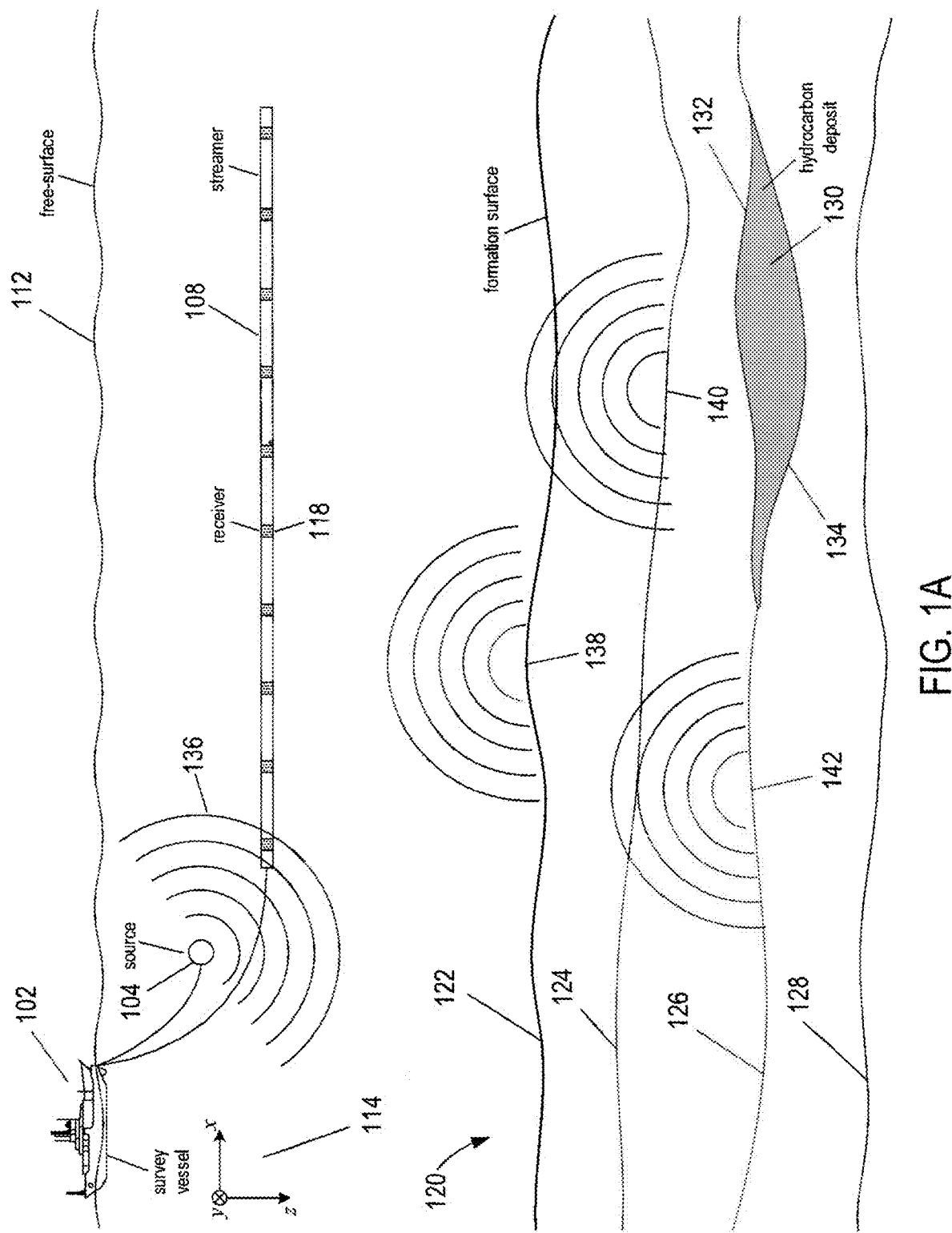
FIGS. 1A-1B show side-elevation and top views of an example seismic data acquisition system.

Wave equation-based seismic imaging is a two-step process for generating images and/or reflectivity models of a subterranean formation from seismic data recorded in a marine survey. At step one, an acoustic wave equation is used to forward propagate a source wavefield and backward propagate reflection events recorded in the seismic data. At step two, an imaging condition is applied to the propagated wavefields to obtain an image that reveals the detailed structural properties or attributes of the subterranean formation. The acoustic wave equation employed at step one models propagation of acoustic waves in a subterranean formation and is traditionally expressed in terms of a seismic velocity model. The seismic velocity model is a map of the seismic velocities associated with layers of the subterranean formation.

Least-squares reverse time migration ("LSRTM") is an iterative seismic imaging process performed in the data space domain to update and improve an image or a reflectivity model of the subterranean formation at each iteration The iterative process minimizes a difference between the reflection events recorded at the receiver locations during the survey and reflection events that are simulated during forward propagation of the source wavefield and is finished when the resulting image or reflectivity model minimizes the difference. However, the velocity models typically used in iterative LSRTM do not represent all the impedance contrasts of the subterranean formations that simulate the reflection events. Thus, a first-order approximation Born theory is used to generate these reflections. The corresponding wave equation is an approximation and does not generate all the reflection events in the recorded seismic data. In addition, at each iteration, two different wave equations are solved during forward and background propagation.

Full-waveform inversion ("FWI") is a similar iterative process to that of LSRTM, except that instead of updating a reflectivity model of a subterranean formation, FWI also improves resolution of a velocity model of the subterranean formation. Conventional FWI does not require reflection events and refraction events are enough to improve the velocity model, when refraction events are available. However, maximum penetration depth from refraction events is limited to a maximum source-receiver offset of the marine survey. For example, in typical deep-water marine surveys performed with a maximum offset of about 8 km, the maximum depth update of the velocity model is severely constrained. By using reflection events in FWI, the depth limitation is removed and it is possible to correctly update the velocity model to a maximum depth where reflection events are generated at the boundaries of the subterranean formations. In addition, the reflectivity model may be updated at each iteration once the velocity model is improved.

As in reflection-based FWI, a smooth velocity model is usually used and most of the reflection events cannot be simulated from such a model. Thus, a density model is used in some approaches. However, building accurate density models of a subterranean formation is challenging and expensive because the process requires interpretation and well integration, which in some cases is not possible. Where wells are available, density models may also be inaccurate away from actual well locations. Other reflection-based FWI approaches use the reflectivity model for image) and the first-order Born theory to generate the reflection events. In order to generate the full-wavefield, it is necessary to solve two different wave equations at each modeling realization. In addition to the inaccuracy due to the limitation of generating multiple scattering.

Processes and systems described herein are directed to using a novel parameterization of an acoustic wave equation to build accurate high-resolution velocity and reflectivity models. The acoustic wave equation enables accurate and efficient simulation of transmitted and reflected components of acoustic waves propagating within the subterranean formation. In particular, the acoustic wave equation may be used with FWI to build accurate, high-resolution velocity and reflectivity models of the subterranean formation and may be used with LSRTM to build a reflectivity model of the subterranean formation. The velocity and reflectivity models reveal subsurface properties of features and layers of a subterranean formation in terms of structure and lithology. Oil and natural gas reservoirs are typically found in layers of sandstone, elastic rocks, and carbonates, such as limestones. These layers have associated seismic velocities and are embedded in particular structural features that are revealed by the reflectivity model or image, which are used to distinguish the layers from other layers in an image of a subterranean formation. For example, shales have seismic velocities in a range of about 0.9-2.5 km/s, oil has seismic velocities in a range of about 1.2-1.25 km/s, sandstones have seismic velocities in a range of about 2.0 6.0 km/s, and granite and basalt have seismic velocities in a range of about 4.5-6.0 km/s. (See e.g., FIG. 5.5 in *Exploration Seismology* 2$^{nd}$ Ed., R. E. Sheriff and L. P. Geldart, Cambridge University Press, 1995) Geoscientists in the oil and gas industry carefully examine images and/or reflectivity models of a subterranean formation and may use velocity models of the subterranean formation to identify rock interfaces or layers that potentially contain oil and natural gas reservoirs. Without accurate seismic images or reflectivity models and associated velocity models of subterranean formations, geoscientists would have to resort to randomly drilling test wells in the hopes of finding a reservoir of oil and natural gas.

The novel acoustic wave equation described herein provides advantages over traditional acoustic wave equations used in velocity model building and seismic imaging: (1) The acoustic wave equation does not require construction of a density model and/or high velocity contrasts of the subterranean formation to simulate reflection events used the iterative velocity model building, such as FWI, and imaging, such as LSRTM. As a result, reflection events may be used to update the velocity and reflectivity models at depths beyond the penetration depth of transmitted waves in FWI. (2) The acoustic wave equation enables generation of a reflectivity model with a smooth velocity model in LSRTM. (3) Use of the acoustic wave equation to determine velocity and reflectivity models in FWI and LSRTM is computationally more efficient than traditional FWI and LSRTM, which use a first-order Born approximation to perturbation theory.

Marine Seismic Surveying

Figure 1B:
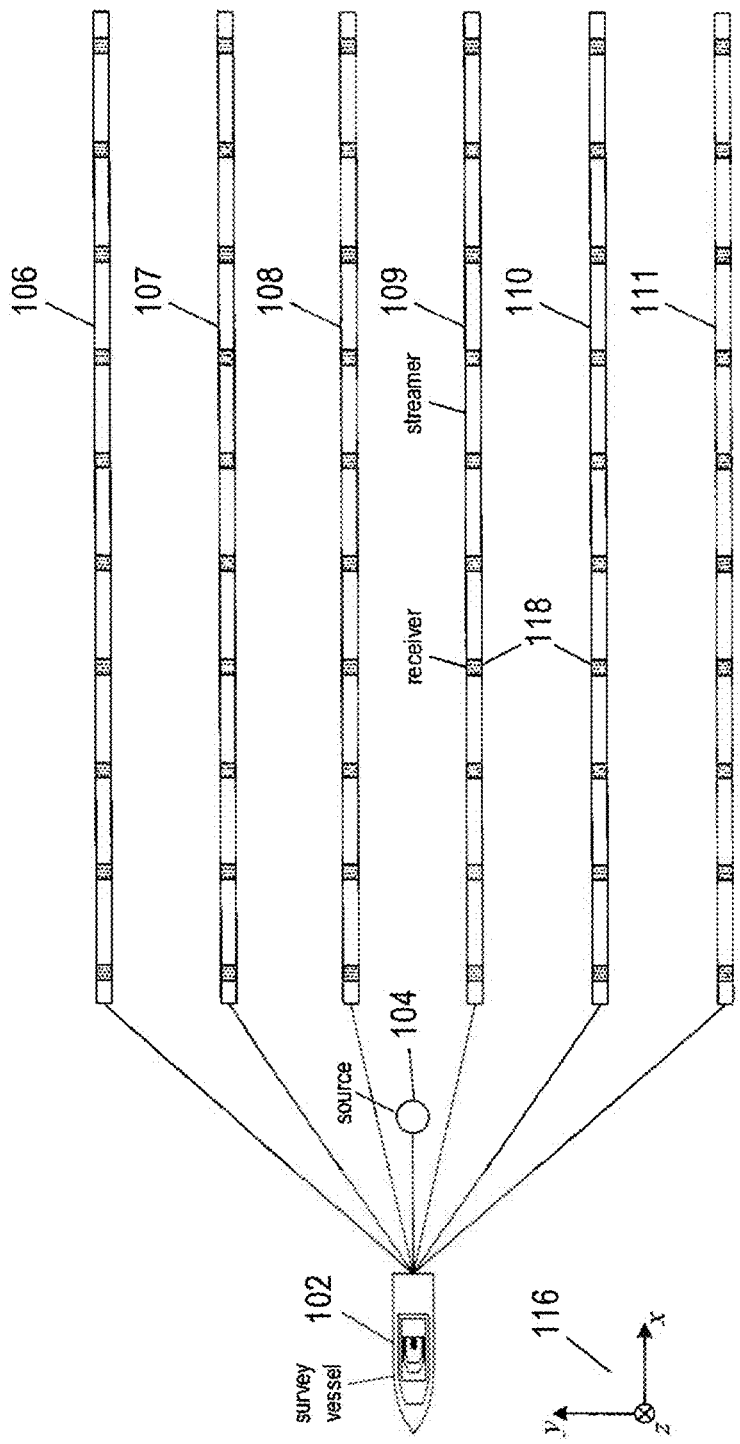

FIGS. 1A-1B show a side-elevation view and a top view, respectively, of an example marine seismic data acquisition system comprising an exploration seismology survey vessel 102 and a source 104. A seismic data acquisition system is not limited to one source as shown in FIGS. 1A-1B. In practice, the number of sources can range from as few as a single source towed by a survey vessel to multiple sources towed by different survey vessels. The body of water can be, for example, an ocean, a sea, or any portion thereof. In this example, the survey vessel 102 tows six streamers 106-111 below the free surface of a body of water. Each streamer is attached at one end to the survey vessel 102 via a streamer-data-transmission cable. A data acquisition surface is not limited to six streamers as shown in FIG. 1B. In practice, the number of streamers used to form a data acquisition surface can range from as few as one streamer to as many as 20 or more streamers. The source 104 may be an impulsive source, such as an array of airguns, or the source 104 may be a vibrational source, such one or more marine vibrators. Additional survey vessels (not shown) may be used to tow additional sources.

FIG. 1A includes an xz-plane 114, and FIG. 1B includes an xy-plane 116, of a Cartesian coordinate system having three orthogonal, spatial coordinate axes labeled x, y and z. The coordinate system specifies orientations and coordinate locations within the body of water. The x-axis specifies the position of a point in a direction parallel to the length of the streamers or the direction of the survey vessel and is referred to as the "in-line" direction. The y-axis specifies the position of a point in a direction perpendicular to the x-axis and substantially parallel to the free surface 112 and is referred to as the "cross-line" direction. The z-axis, also referred to as the "depth" axis, specifies the position of a point in a direction perpendicular to the xy-plane (i.e., perpendicular to the free surface 112) with the positive z-direction pointing downward away from the free surface 112.

The streamers may be towed to form a planar horizontal seismic data acquisition surface with respect to the free surface 112. However, in practice, the streamers may be smooth varying due to active sea currents and weather conditions. A seismic data acquisition surface is not limited to the parallel streamers shown in FIGS. 1A and 1B. In other implementations, the streamers may be towed with progressively larger streamer separation in the crossline direction toward longer distances from the survey vessel 102 in a process called "streamer fanning." Streamer fanning spreads the streamers farther apart with increasing distance from the survey vessel in the inline direction. Streamer fanning may improve coverage at far source/receiver offsets without compromising seismic data resolution or seismic data quality and may also increase acquisition efficiency by reducing seismic data infill. In still other implementations, the streamers may be towed with a downward slant with increasing distance from the survey vessel.

The streamers 106-111 are typically long cables containing power and data-transmission lines coupled to receivers (represented by shaded rectangles) such as receiver 118 that are spaced-apart along the length of each streamer. The data transmission lines couple receivers to seismic data acquisition equipment, computers, and data-storage devices located onboard the survey vessel 102. Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

In FIG. 1A, curve 122, the formation surface, represents a top surface of the subterranean formation 120 located at the bottom of the body of water. The subterranean formation 120 may have subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, such as oil and natural gas, the depth and positional coordinates of which may be determined, at least in part, by the processes and systems described herein. As the survey vessel 102 moves over the subterranean formation 120, the source 104 is activated (i.e., fired or shot) to produce an acoustic signal. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially-reflected and partially refracted. As a result, each point of the formation surface 122 and each point of the interfaces 124, 126, and 128 may be a reflector or reflection point that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as reflection point 138, and from reflection points on or very close to interfaces in the subterranean formation 120, such as reflection points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the reflection point 138, may receive a pressure disturbance from the source wavefield more quickly than a point within the subterranean formation 120, such as reflection points 140 and 142. Similarly, a reflection point on the formation surface 122 directly beneath the source 104 may receive the pressure disturbance sooner than a more distant-lying reflection point on the formation surface 122. Thus, the times at which waves are reflected from various reflection points within the subterranean formation 20 may be related to the distance, in three-dimensional space, of the reflection points from the activated source 104.

Acoustic and elastic waves may travel at different velocities within different materials as well as within the same material under different pressures. Therefore, the travel times of the source wavefield and reflected wavefield are functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to geoscientists.

Each receiver 118 may be a multi-component sensor including particle motion sensors and a pressure sensor. A pressure sensor detects variations in water pressure over time. The term "particle motion sensor" refers to a sensor that detects particle displacement, particle velocity, or particle acceleration over time. Each pressure sensor and particle motion sensor may include an analog-to-digital converter that converts time-dependent analog signals into discrete time series that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of acoustic energy, such as the acoustic energy in a subterranean formation response to the source wavefield that passes from the source 104 and into the subterranean formation where a portion of the acoustic energy is reflected and or refracted, and ultimately detected by a sensor. In general, each trace is an ordered set of discrete spatial and time-dependent pressure or particle motion sensor amplitudes denoted by:

$$tr(\vec{x}^r, \vec{x}^s, t) = \{A(\vec{x}^r, \vec{x}^s, t_k)\}_{k=1}^{M} \quad (1)$$

where tr represents a trace of pressure, particle displacement, particle velocity, or particle acceleration data;

t represents time;

$\vec{x}^r$ is the Cartesian coordinates $(x^r, y^r, z^r)$ of a receiver 118;

$\vec{x}^s$ is the Cartesian coordinates $(x^s, y^s, z^s)$ of the source 104;

A is pressure, particle displacement, particle velocity, or particle acceleration amplitude;

$t_k$ is the k-th sample time; and

M is the number of time samples in the trace.

The coordinate location $\vec{x}^r$ of each receiver may be determined from global position information obtained from one or more global positioning devices located along the streamers, survey vessel, and buoys and the known geometry and arrangement of the streamers and receivers. The coordinate location $\vec{x}^s$ of the source 104 may also be obtained from one or more global positioning devices located at each source and the know geometry and arrangement of source elements of the source 104. The source and receiver coordinates define an acquisition geometry for recording seismic data. In the following discussion the source coordinate location is suppressed. Each trace also includes a trace header not represented in Equation (1) that identifies the specific receiver that generated the trace, receiver and source GPS spatial coordinates, and may include the time sample rate and the number of time samples.

Figure 2:
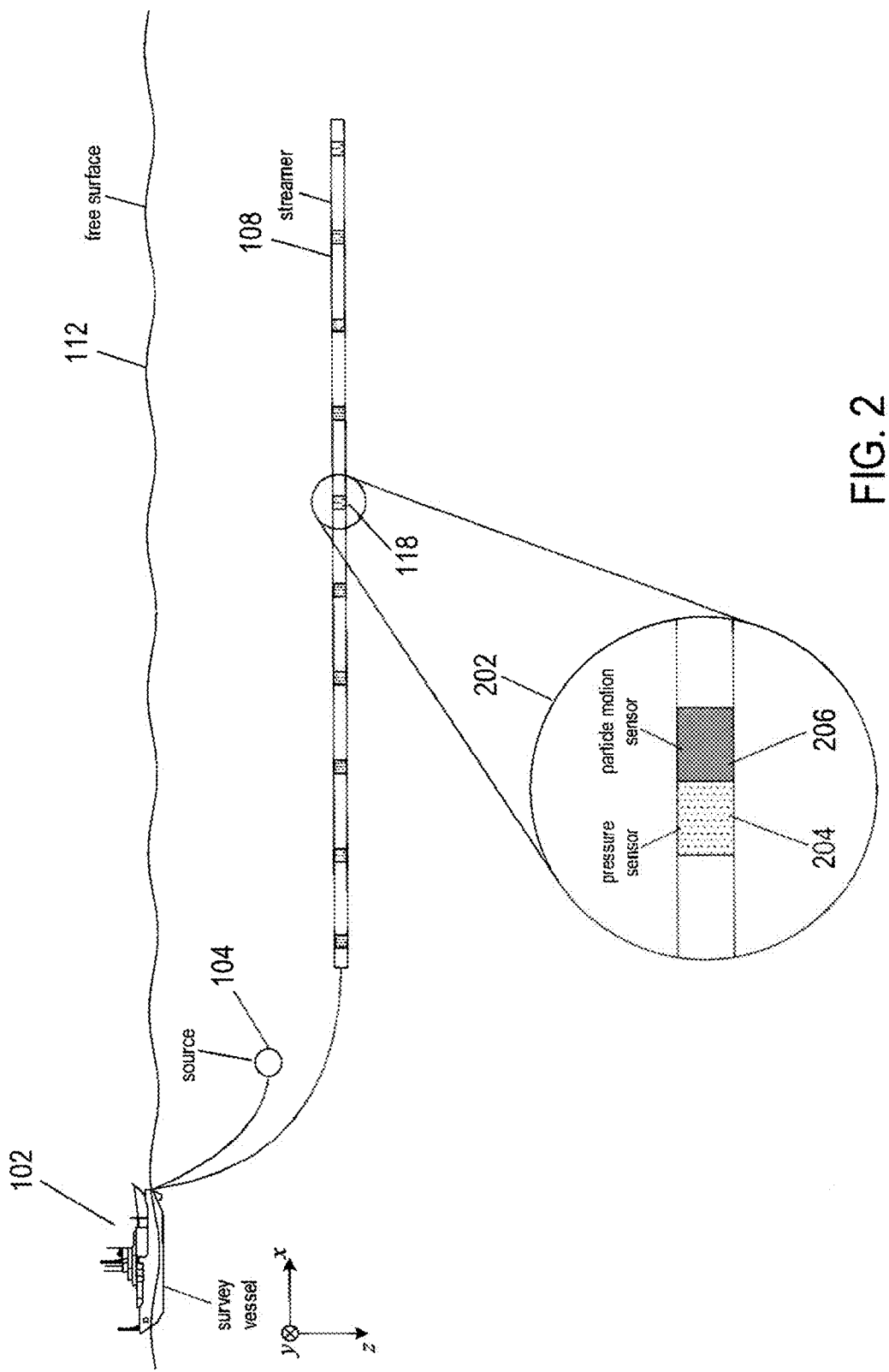
FIG. 2 shows a side-elevation view of a seismic data acquisition system with a magnified view of a receiver.

FIG. 2 shows a side-elevation magnified view 202 of the receiver 118. In this example, the magnified view 202 reveals that the receiver 118 is a multi-component sensor comprising a pressure sensor 204 and a particle motion sensor 206. The pressure sensor may be, for example, a hydrophone. Each pressure sensor is a non-directional sensor that measures changes in hydrostatic pressure over time to produce a trace of pressure data denoted by $p(\vec{x}^r, t)$. The particle motion sensors may be responsive to water motion. The particle motion sensors are directional sensors that detect particle motion (i.e., displacement, velocity, or acceleration) in a particular direction and may be responsive to such directional displacement of the particles, velocity of the particles, or acceleration of the particles. A particle motion sensor that measures particle displacement produces a trace of particle displacement data denoted by $g_{\vec{n}}(\vec{x}^r, t)$, where the vector $\vec{n}$ represents the direction along which particle displacement is measured. A particle motion sensor that measures particle velocity (i.e., particle velocity sensor) generates a trace of particle velocity data denoted by $v_{\vec{n}}(\vec{x}^r, t)$. A particle motion sensor that measures particle acceleration (i.e., accelerometer) generates a trace of particle acceleration data denoted by $a_{\vec{n}}(\vec{x}^r, t)$. The data generated by one type of particle motion sensor may be converted to another type. For example, particle displacement data may be differentiated to obtain particle velocity data, and particle acceleration data may be integrated to obtain particle velocity data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n} = (0,0, z)$) in which case $g_z(\vec{x}^r, t)$ is called vertical displacement wavefield, $v_z(\vec{x}^r, t)$ is called vertical velocity wavefield, and $a_z(\vec{x}^r, t)$ is called vertical acceleration wavefield. Alternatively, each receiver 118 may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver 118 may include a pressure sensor and three particle motion sensors that measure particle motion in three orthogonal directions. For example, in addition to having a particle motion sensor that measures particle velocity in the z-direction to give $v_z(\vec{x}^r, t)$, each receiver may include a particle motion sensor that measures the wavefield in the in-line direction in order to obtain the in-line velocity wavefield, $v_x(\vec{x}^r, t)$, and a particle motion sensor that measures the wavefield in the cross-line direction in order to obtain the cross-line velocity wavefield, $v_y(\vec{x}^r, t)$. In certain implementations, the receivers may be only pressure sensors, and in other implementations, the receivers may be only particle motion sensors. The three orthogonal velocity data sets form a velocity vector $\vec{v} = (v_x, v_y, v_z)$.

The streamers 106-111 and the survey vessel 102 may include sensing electronics and data-processing facilities that allow seismic data generated by each receiver to be correlated with the location of the source 104, absolute positions on the free surface 112, and absolute three-dimensional positions with respect to an arbitrary three-dimensional coordinate system. The seismic data may be stored at the receiver and/or may be sent along the streamers in data transmission cables to the survey vessel 102, where the seismic data may be stored on data-storage devices located onboard the survey vessel 102 and/or transmitted onshore to a seismic data-processing facility.

As explained above, the reflected wavefield typically arrives first at the receivers located closest to the sources. The distance from the sources to a receiver is called the "source-receiver offset," or simply "offset." A larger offset generally results in a longer arrival time delay. Traces are sorted according to different source and receiver locations and are collected to form "gathers" that can be further processed using various seismic data processing techniques to obtain information about the structure of the subterranean formation. The traces may be sorted into different domains such as, for example, a common-shot domain, common-receiver domain, common-receiver-station domain, and common-midpoint domain. A collection of traces sorted into the common-shot domain is called a common-shot gather. A collection of traces sorted into common-receiver domain is called a common-receiver gather.

The portion of the acoustic signal reflected into the body of water from the subterranean formation and that travels directly to the receivers is called a primary reflected wavefield or simply a "primary." Other portions of the acoustic signal reflected into the body of water may be reflected many times between the free surface and interfaces within the subterranean formation before reaching the receivers. These multiple reflected wavefields are simply called "multiples." Still other portions of the acoustic signal may create head waves and diving waves within the subterranean formation before being reflected into the body of water. Head waves are created when a portion of the acoustic signal traveling downward through a low-velocity layer reaches a higher velocity layer at the critical angle. Head waves travel in the higher velocity layer parallel to an interface between the layers before being reflected upward toward the formation surface. Diving waves are created when a portion of the acoustic signal travels within a progressively compacted layer, creating a velocity gradient in which velocities increase with depth. Diving waves are continuously refracted along curved ray paths that turn upward toward the surface. The deepest point along the curved ray path is called the "turning point."

Figure 3:
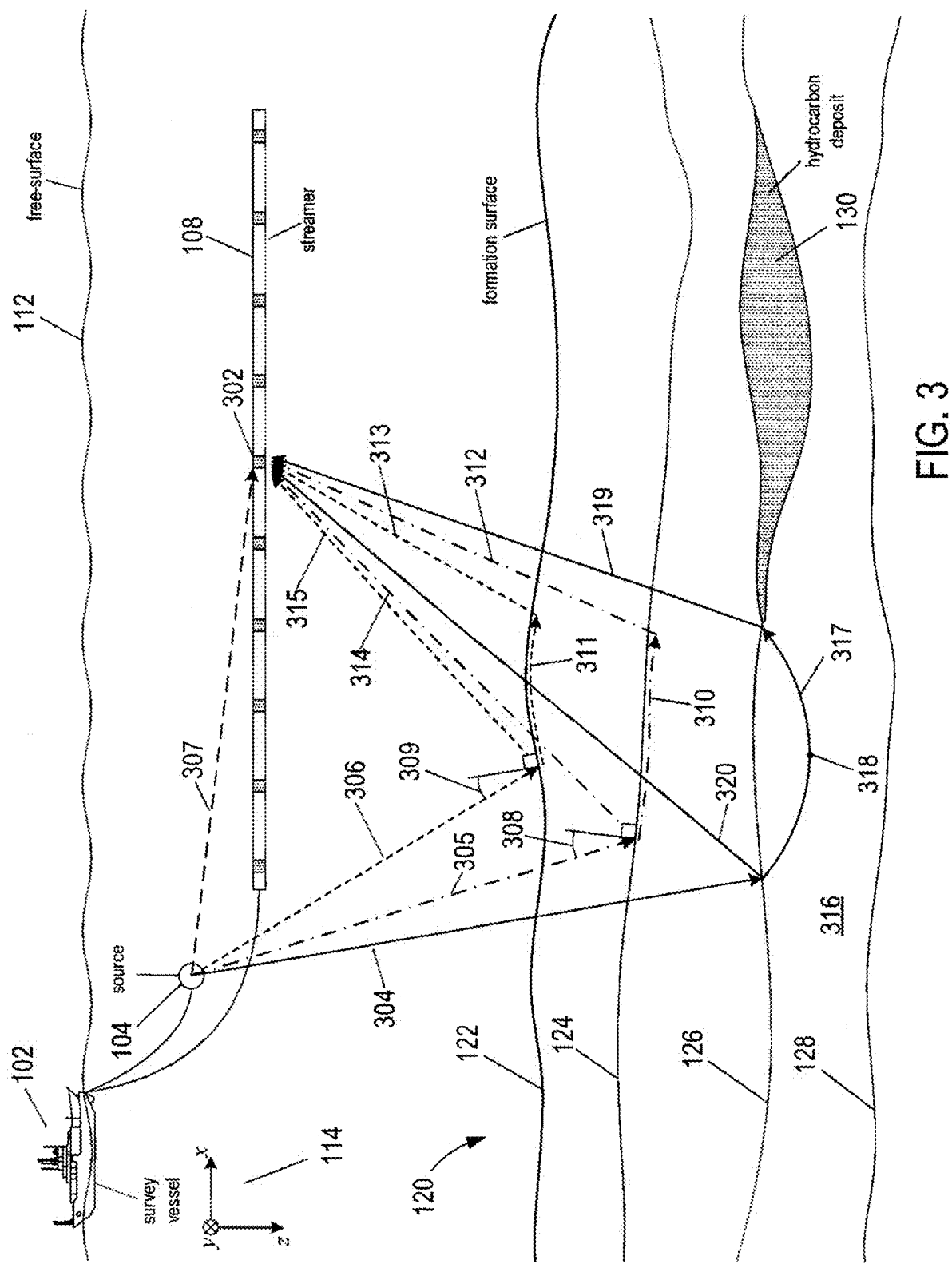
FIG. 3 shows a side elevation view of different example ray paths acoustic energy travels between a source and a receiver of a streamer.

FIG. 3 shows a side elevation view of different example ray paths acoustic energy travels between the source 104 and a receiver 302 of the streamer 108. Differently patterned directional arrows 304-307 represent ray paths of different portions of an acoustic signal generated by the source 104. Ray paths 304-306 represent different portions of acoustic energy that interact with the subterranean formation 120. Ray path 307 represents a portion of the acoustic energy that travels directly to the receiver 302. Ray paths 305 and 306 represent paths of acoustic energy that strike the interface 124 and surface 122 at critical angles 308 and 309, respectively, creating head waves that travel along ray paths 310 and 311 adjacent to the interface 124 and surface 122. Ray paths 310 and 311 represent the paths of head waves that travel within the higher velocity layer overlain by a low velocity layer. Ray paths 312 and 313 represent upward reflections of the acoustic energy of the head waves to the receiver 302. Ray paths 314 and 315 represent different portions of the acoustic energy traveling along ray paths 305 and 306, respectively, that are reflected upward from the interface 124 and the surface 122 to the receiver 302. Ray path 304 reaches the interface 126 of a layer 316 with progressive compaction, creating a vertical velocity gradient in which velocities increase with increasing depth. Curved ray path 317 represents a continuously refracted path of a diving wave that reaches a turning point 318 within the layer 316 and is turned upward to the receiver 302 along ray path 319. Ray path 320 represents a portion of the acoustic energy traveling along ray path 304 that is reflected upward from the interface 126 to the receiver 302. Deeper penetrating acoustic energy (not shown) tends to be reflected back toward the surface 112 but may reach the surface 112 too far away to be recorded by the receivers.

Figure 4:
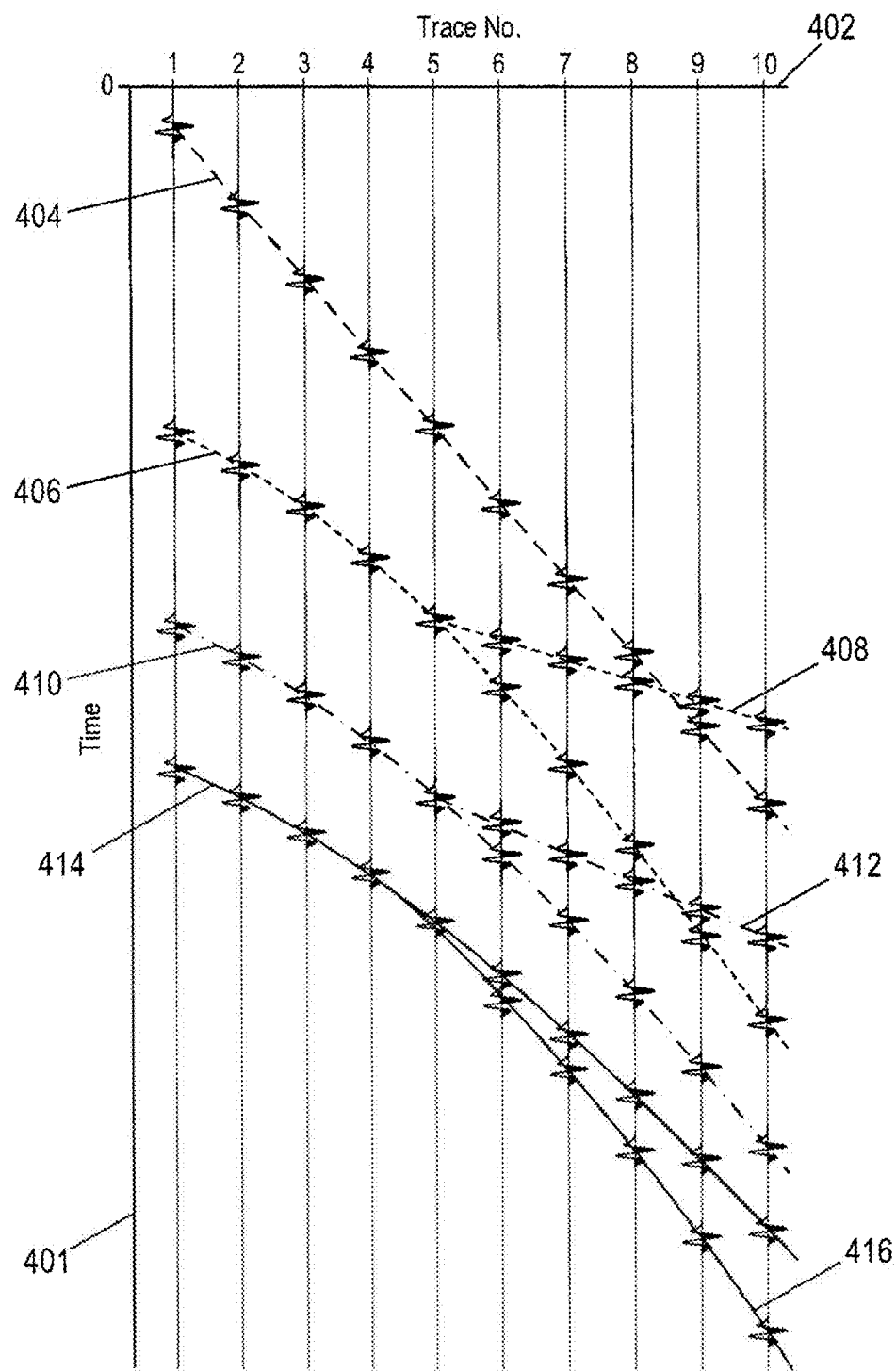
FIG. 4 shows an example common-shot gather of example traces of reflected wavefields measured by receivers located along a streamer shown in FIG. 3.

FIG. 4 shows an example common-shot gather 400 of example traces of reflected wavefields measured by the receivers located along the streamer 108 shown in FIG. 3. Vertical axis 401 represents time. Horizontal axis 402 represents channels or trace numbers with trace "1" representing a trace of seismic data generated by a receiver located closer to the source 104 than trace "10" representing a trace of seismic data generated by a receiver located farther away from the source 104. Wavelets represent reflection events from an interface or a surface. The distance along a trace from time zero to the location of a wavelet represents the travel time of the acoustic energy output from the source 104 to an interface or surface and eventually to a receiver located along the streamer 108. Differently patterned lines are added to represent wavefields that correspond to the example reflection events represented by corresponding differently patterned ray paths illustrated in FIG. 3. For example, wavelets located along trace 6 correspond to the reflection events that reach the receiver 302 as represented by differently patterned lines in FIG. 3. Wavelets located along dashed curve 404 represent a portion of the acoustic signal generated by the source 104 that travels directly to the receivers. Wavelets located along dashed curve 406 represents changes in pressure that correspond to acoustic energy reflected upward from the formation surface 122 as represented by ray path 315 in FIG. 3. Wavelets located along dashed line 408 represents changes in pressure created by the head waves that travel just below the surface 122, as represented by ray paths 311 and 313 in FIG. 3. Wavelets located along dot-dashed curve 412 represent changes in pressure that correspond to acoustic energy reflected upward from the interface 124, as represented by ray path 314 in FIG. 3. Dotted-dashed line 412 represents changes in pressure created by the head waves that travel just below the interface 124, as represented by ray paths 310 and 312 in FIG. 3. Wavelets located along curve 414 represent changes in pressure that correspond to acoustic energy reflected upward from the interface 126, as represented by ray path 320 in FIG. 3. Wavelets located along curve 416 represent a diving wavefield created by a portion of the acoustic signal that is turned upward from a vertical velocity gradient of the layer 316 as represented by ray paths 317 and 319 in FIG. 3. Note that for the sake of simplicity of illustration and discussion, the example traces in FIG. 4 only record a small number of the reflected wavefields and do not represent other reflections and various types of random and coherent noise that are typically recorded during a marine seismic survey, such as shot noise, swell noise, barnacle noise, streamer vibration, and bird noise.

Subterranean formations may also be surveyed using ocean bottom seismic techniques. In one implementation, these techniques may be performed with ocean bottom cables ("OBCs") laid on or near the water bottom. The OBCs are similar to towed streamers described above in that the OBCs include spaced-apart receivers, such as collocated pressure and/or particle motion sensors, deployed approximately every 25 to 50 meters. In other implementation, ocean bottom nodes ("OBNs") may be deployed along the formation surface. Each node may have collocated pressure and/or particle motion sensors. The OBCs and OBNs may be electronically connected to an anchored recording vessel that provides power, instrument command and control of the pressure and/or vertical velocity wavefield sent to recording equipment located on board the vessel. Traces of recorded seismic data using streamers, as described above, OBCs, or OBNs may processed as described below.

Acoustic Wave Equation Parameterized in Terms of Velocity and Vector Reflectivity The variable density acoustic wave equation in terms of velocity and density is given by $$\frac{\partial^2 p(\vec{x}, t)}{\partial t^2} - V^2(\vec{x})\rho(\vec{x})\vec{\nabla} \cdot \left(\frac{1}{\rho(\vec{x})}\vec{\nabla} p(\vec{x}, t)\right) = S(\vec{x}, t) \qquad (2)$$

where $\vec{x}$ is an observation point with Cartesian coordinates (x, y, z) in a three-dimensional space;
p($\vec{x}$, t) is the pressure wavefield;
V($\vec{x}$) is the seismic velocity;
ρ($\vec{x}$) is the density;
S($\vec{x}$, t) is the source; and
$\vec{\nabla}$ is the gradient operator.

The collection of observation points $\vec{x}$ form the image domain. Acoustic wave impedance is a product of the seismic velocity and the density:

$$Z(\vec{x}) = V(\vec{x})\rho(\vec{x}) \qquad (3)$$

Using Equation (3) to substitute for the density in Equation (2) gives the acoustic wave equation in terms of the seismic velocity and impedance as follows:

$$\frac{\partial^2 p(\vec{x}, t)}{\partial t^2} - V(\vec{x})Z(\vec{x})\vec{\nabla} \cdot \left(\frac{V(\vec{x})}{Z(\vec{x})}\vec{\nabla} p(\vec{x}, t)\right) = S(\vec{x}, t) \qquad (4)$$

Equation (4) may be expanded to obtain $$\frac{\partial^2 p(\vec{x}, t)}{\partial t^2} - V(\vec{x})\vec{\nabla} V(\vec{x}) \cdot \vec{\nabla} p(\vec{x}, t) + \qquad (5)$$

$$V^2(\vec{x})Z(\vec{x})\vec{\nabla}\left(\frac{1}{Z(\vec{x})}\right) \cdot \vec{\nabla} p(\vec{x}, t) = S(\vec{x}, t)$$

Vector reflectivity is defined as $$\vec{R}(\vec{x}) = -\frac{1}{2}Z(\vec{x})\vec{\nabla}\left(\frac{1}{Z(\vec{x})}\right) \qquad (6)$$

where $\vec{R}(\vec{x}) = (R_x(\vec{x}), R_y(\vec{x}), R_z(\vec{x}))$;
$R_x(\vec{x})$ is the inline reflectivity component;
$R_y(\vec{x})$ is the crossline reflectivity component; and
$R_z(\vec{x})$ is the depth or vertical reflectivity component.

The acoustic wave equation in Equation (4) may be rewritten in terms of velocity and vector reflectivity as follows:

$$\left[\frac{\partial^2}{\partial t^2} - V(\vec{x})\vec{\nabla} \cdot (V(\vec{x})\vec{\nabla}) + 2V^2(\vec{x})(\vec{R}(\vec{x}) \cdot \vec{\nabla})\right]p(\vec{x}, t) = S(\vec{x}, t) \qquad (7)$$

The solution of Equation (7) is a complete pressure wavefield for steep reflection events (i.e., large dips). The time and space derivative operator on the left-hand side of Equation (7) models time and space propagation of seismic waves through various materials of the subterranean formation based on seismic velocities V($\vec{x}$) and reflectivity $\vec{R}(\vec{x})$ of the various materials. For practical purposes, in most of the geological settings of economic interest that do not consider extreme steep dips, Equation (7) may be simplified by only considering vertical reflectivity in the z-direction. As a result, Equation (7) reduces to $$\left[\frac{\partial^2}{\partial t^2} - V(\vec{x})\vec{\nabla} \cdot (V(\vec{x})\vec{\nabla}) + 2V^2(\vec{x})(R_z(\vec{x})\vec{\nabla})\right]p(\vec{x}, t) = S(\vec{x}, t) \qquad (8)$$

where $R_z(\vec{x})$ is the z-component of the vector reflectivity $\vec{R}(\vec{x})$.

The acoustic wave equations in Equations (7) and (8) do not require a density field or high velocity contrasts to compute simulated reflections in the modeled data. Instead, the acoustic wave equations depend on a velocity model and the reflectivity (or image), which are available from previous steps in the velocity model building and imaging process. An acoustic wave traveling through a subterranean formation has a seismic velocity denoted by V($\vec{x}$) and a vector reflectivity $\vec{R}(\vec{x})$. The seismic velocity V($\vec{x}$) represents acoustic wave properties of a medium in terms of the speed at which acoustic waves travel within a subterranean formation. Each component of vector reflectivity $\vec{R}(\vec{x})$ is the normalized change of impedance in a particular direction. For example, at a horizontal layered medium, the vertical component of the reflectivity is equivalent to the reflection coefficient. The seismic velocity and vector reflectivity depend on the observation point $\vec{x}$, the composition of the medium varies from point to point. An observation point may represent a point located along a surface of a subterranean formation or represent a point along an interface between two different types of rock, sediment, or fluid within the subterranean formation. An observation point may also represent a point within a layer of fluid or solid with a homogeneous composition.

Although the following discussion describes building velocity and/or reflectivity models using Equation (7), in alternative implementations, Equation (8) may be substituted for Equation (7). The term reflectivity model refers to a vector reflectivity model $\vec{R}(\vec{x})$ or a vertical reflectivity model with $\vec{R}(\vec{x}) = (0, 0, R_z(\vec{x}))$.

Building Velocity and Reflectivity Models of a Subterranean Formation with Full-Waveform Inversion Processes and systems described below are directed to generating velocity and reflectivity models of a subterranean formation from a pressure wavefield recorded in a marine survey of the subterranean formation. They velocity and reflectivity models are obtained with iterative FWI using the acoustic wave equation given by Equation (7) and may be used to identify features that correspond to oil and natural gas reservoirs. The velocity model by itself may be used in depth migration to improve the resolution of an image of the subterranean formation.

Figure 5:
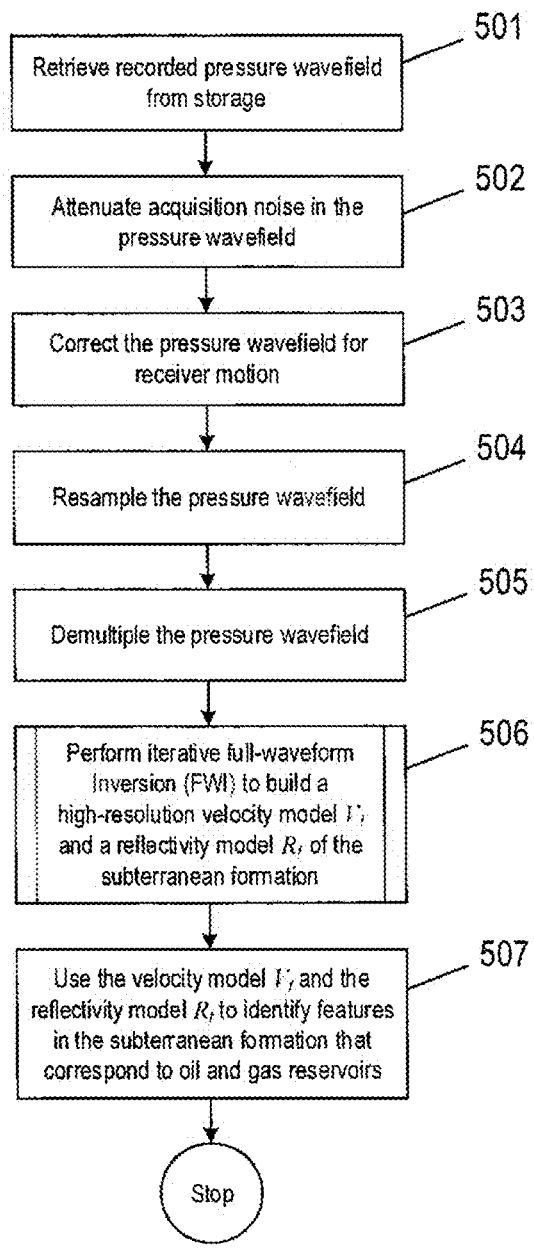
FIG. 5 shows a process for building velocity and reflectivity models of subterranean formation from a pressure wavefield recorded in a marine seismic survey of the subterranean formation according to an example implementation.

FIG. 5 shows a process for building velocity and reflectivity models of a subterranean formation from a pressure wavefield recorded in a marine seismic survey of a subterranean formation. Each block represents a different module of computer implemented machine-readable instructions stored in one or more data-storage devices and executed using one or more processors of a computer system. The construction of the velocity model may include additional modules or certain modules may be omitted or executed in a different order, depending on how the recorded seismic data is collected, conditions under which the recorded seismic data is collected, and depth of the body of water above the subterranean formation.

In FIG. 5, block 501 represents retrieving a pressure wavefield recorded in a marine survey of a subterranean formation as described above with reference to FIGS. 1A-3. Blocks 502-505 describe computational operations that precondition the pressure wavefield data. In block 502, acquisition noise in the pressure wavefield, such swell noise and barnacle noise, is attenuated. In block 503, the pressure wavefield is corrected for receiver motion created by moving streamers in the body of water. In block 504, after receiver motion correction, the seismic data is resampled. Multiple reflections, or simply "multiples," are acoustic waves that have bounced more than once from subsurface reflectors and/or the free surface in contrast to primary reflections, or simply "primaries." which have reflected only once from the subterranean formation. In block 505, multiples in the pressure wavefield are attenuated or suppressed. In block 506, a "perform iterative full-waveform inversion ("FWI") to build a high-resolution velocity model $V_f$ and reflectivity model $\vec{R}_f$ of the subterranean formation" procedure is performed. An example implementation of the "perform iterative full-waveform inversion ("FWI") to build a high-resolution velocity model $V_f$ and a reflectivity model $\vec{R}_f$ of the subterranean formation" procedure is described below with reference to FIG. 6. In block 507, the velocity model and the reflectivity model may be used to identify structural and lithological features in the subterranean formation that correspond to oil and gas reservoirs. The velocity and reflectivity models of a subterranean formation are displayed on monitors, projected onto screens, or displayed using other visual display devices. In some cases, the velocity and reflectivity models may be used to identify the composition of features and layers within a subterranean formation, such as oil and natural gas accumulations, and may be used for pre-drill prediction of pore pressure, enabling geoscientist to take steps that mitigate the risks and hazards associated with drilling into high-pressure petroleum reservoirs. Velocity and reflectivity models and images generated from the pressure wavefield recorded at different stages of oil or natural gas extraction of a reservoir may be used be used by geoscientist to monitor over time extraction of oil and natural gas from the reservoir.

Figure 6:
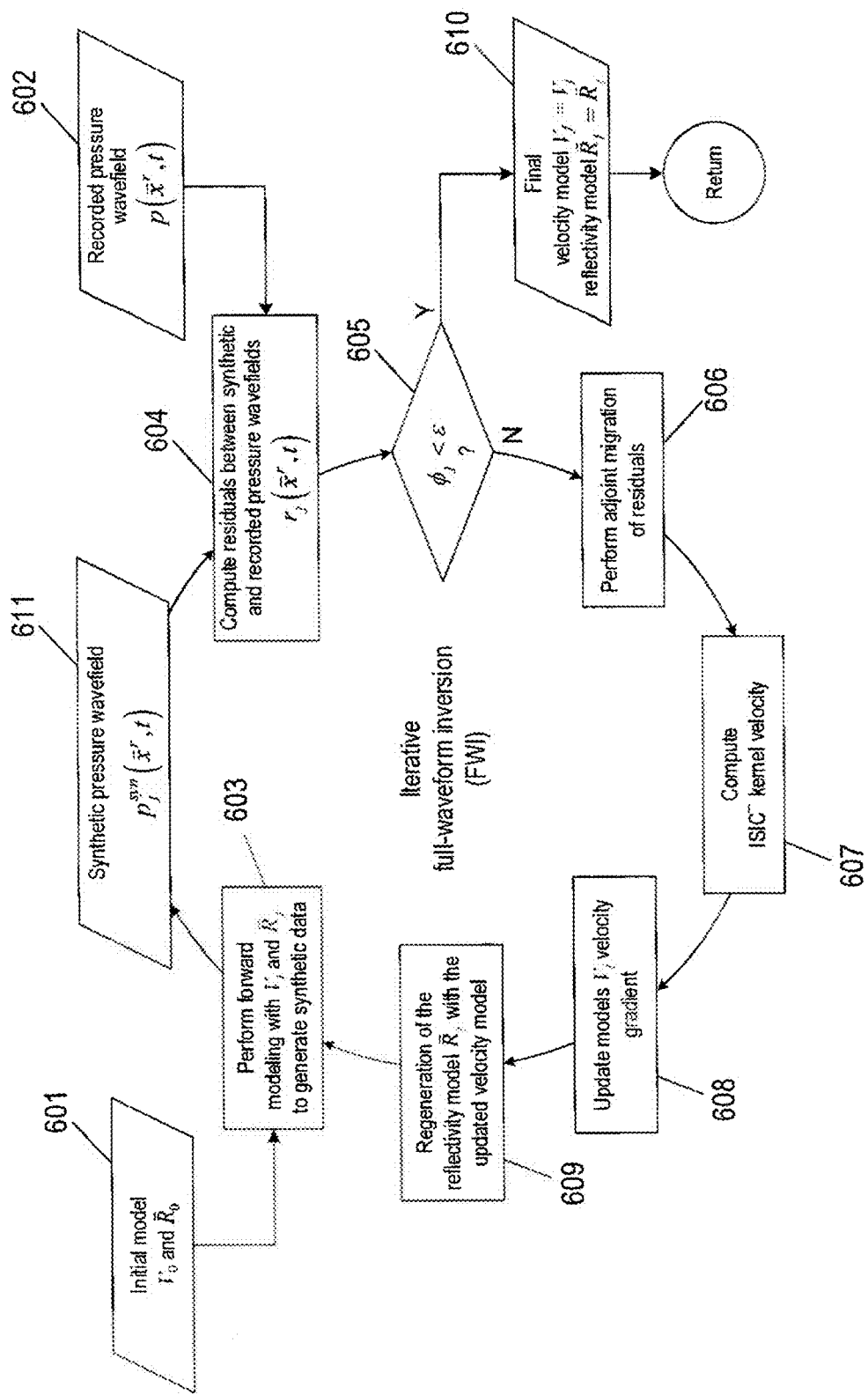
FIG. 6 is a flow diagram illustrating an example implementation of the "perform iterative full-waveform inversion ("FWI") to build a high-resolution velocity model $V_f$ and a reflectivity model $\vec{R}_f$ of the subterranean formation" procedure referenced in FIG. 5.

FIG. 6 is a flow diagram illustrating an example implementation of the "perform iterative full-waveform inversion ("FWI") to build a high-resolution velocity model $V_f$ and a reflectivity model $\vec{R}_f$ of the subterranean formation" procedure referenced in block 506 of FIG. 5. In block 601, an initial smooth velocity model, denoted by $V_0$, and an initial reflectivity model, denoted by $\vec{R}_0$, are received as input. The initial velocity model $V_0$ and the initial vector reflectivity model $\vec{R}_0$ may have been generated from previous velocity model building and imaging processes. In block 602, traces of a recorded pressure wavefield denoted by $p(\vec{x}^r, t)$ that have been obtained as described above with reference to FIGS. 1A-3 are received as input. Iterative FWI is executed by the computational operations represented by blocks 603-609. Iterative FWI computes a final velocity model denoted by $V_f$ and a final reflectivity model $\vec{R}_f$ that are output in block 610.

Figure 7:
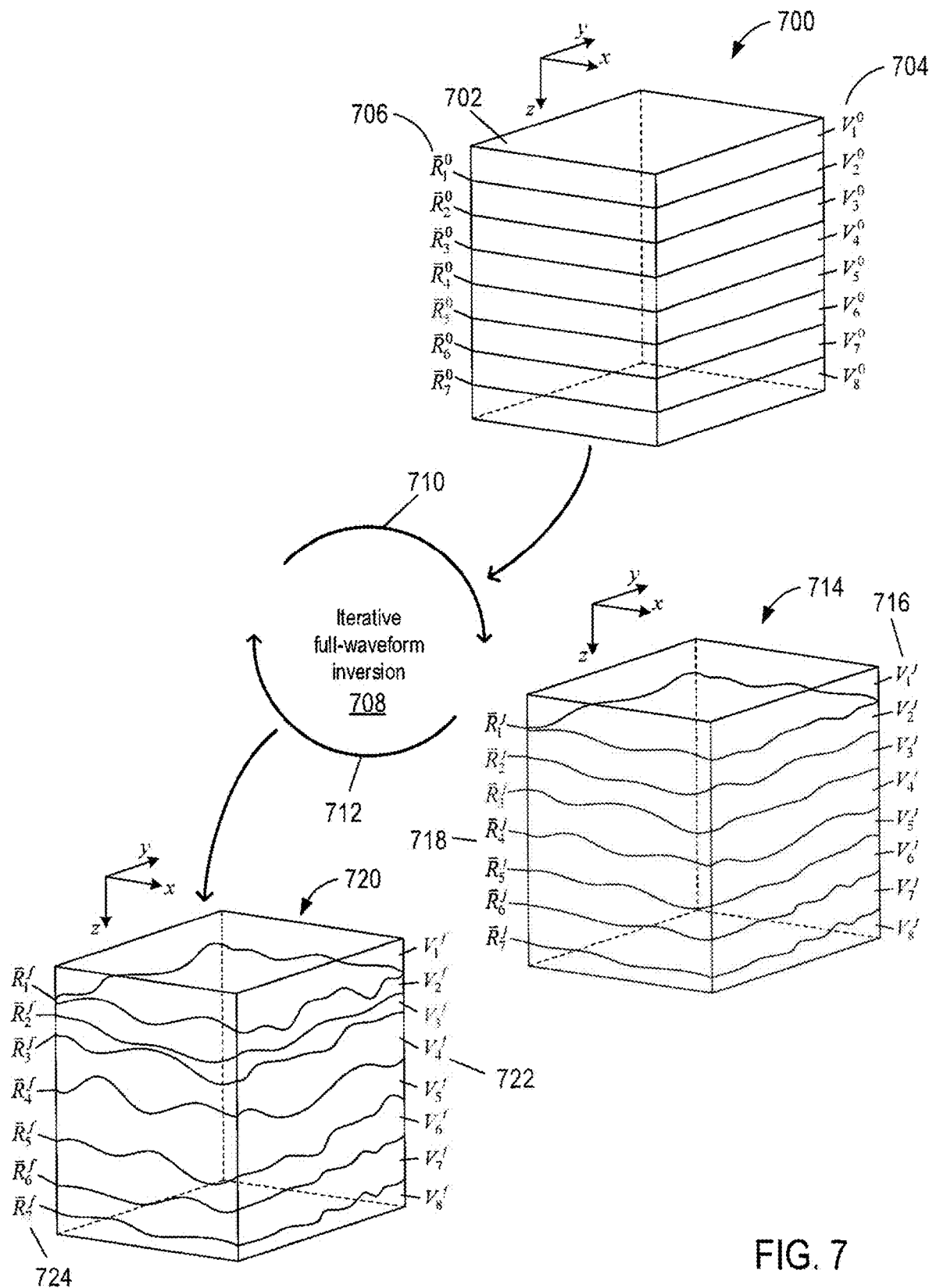
FIG. 7 shows a high-level representation of iterative FWI performed in FIG. 6.

FIG. 7 shows a high-level representation of iterative FWI executed by blocks 603-609 of FIG. 6. Consider an example of a three-dimensional synthetic medium 700 that represents an initial approximation of multiple layers of a subterranean formation. This example synthetic medium 700 comprises eight isotropic layers. Each layer occupies a separate three-dimensional volume within the synthetic medium 700. Initially, each layer has a uniform thickness in the z-direction and represents a homogeneous fluid or solid layer within the synthetic medium 700. For example, top layer 702 may represent a body of water. Layers located below the top water layer 702 may represent different layers of rock, sediment, or fluid within the subterranean formation. Each layer of the synthetic medium 700 has an initial associated seismic velocity recorded in a velocity model. Each interface between layers has an initial associated reflectivity recorded in a reflectivity model. Seismic velocities of the layers in the synthetic medium 700 are denoted by $V_q^0$, where superscript "0" identifies the seismic velocities of the initial velocity model $V_0$ and subscript q=1, . . . , 8 corresponds to the eight layers of the synthetic medium 700. Reflectivity of the interfaces in the synthetic medium 700 are denoted by $\vec{R}_q^0$, where superscript "0" identifies the reflectivity of the initial reflectivity model $\vec{R}_0$ and subscript q=1, . . . ,7 corresponds to the interfaces between layers and formations of the synthetic medium 700. Because the layers of the synthetic medium are homogeneous, observation points within the same layer of the synthetic medium 700 have the same seismic velocity. The seismic velocity at an observation point $\vec{x}$ in the q-th layer is denoted by $V_q^0(\vec{x})$. Reflectivity at an observation point located at an interface is denoted by $R_q^0(\vec{x})$. The synthetic medium 700 is a representative initial model of a subterranean formation, and for ease of illustration, has only eight layers and seven interfaces with corresponding seismic velocities and reflectivity. In other implementations, the number of layers may be more or less than eight. In FIG. 7, iterative FWI 708 is represented by directional arrows 710 and 712. The initial velocity model $V_0$ and initial reflectivity model $\vec{R}_0$ for the synthetic medium 700 are input to the iterative FWI 708. Each iteration of the iterative FWI 708 updates the locations of reflectors (i.e., z-coordinate locations of the surface and interfaces) in the synthetic medium, updates velocities in the velocity model, and updates reflectivity of the interfaces in the reflectivity model. The velocity and reflectivity models generated after each iteration of iterative FWI 708 are denoted by $V_j$ and $\vec{R}_j$, respectively, where j is a non-negative integer used to denote the j-th iteration of iterative FWI 708. FIG. 7 shows an example synthetic medium 714 and associated seismic velocities 716 of the j-th velocity model $V_j$ and reflectivity 718 of the j-th reflectivity model $\vec{R}_j$ after completion of the j-th iteration. FIG. 7 shows an example final synthetic medium 720 and associated seismic velocities 722 of the final velocity model $V_f$ and reflectivity 724 of the final reflectivity model $\vec{R}_f$ after completion of the final iteration of iterative FWI 708. As shown in FIG. 7, iterative FWI 708 changes the configuration of the layers and interfaces of the layers in the synthetic medium 720 to approximate the configuration of the layers and interfaces in the actual subterranean formation.

Returning to FIG. 6, each iteration of iterative FWI begins with block 603. In block 603, forward modeling is performed to compute a synthetic pressure wavefield at each subsurface point as a function of time, $p_j^{syn}(\vec{x}, t)$ based on the j-th velocity model $V_j$ updated in block 608 and the j-th vector reflectivity model $\vec{R}_j$ updated in block 609. The traces of synthetic pressure data 611 at the receiver locations are denoted by $p_j^{syn}(\vec{x}^r, t)$. In block 603, forward modeling is performed using Equation (7):

$$\left[\frac{\partial^2}{\partial t^2} - V_j(\vec{x})\vec{\nabla}\cdot(V_j(\vec{x})\vec{\nabla}) + 2V_j^2(\vec{x})(\vec{R}_j(\vec{x})\cdot\vec{\nabla})\right]p_j^{syn}(\vec{x}, t) = S_j(\vec{x}, t) \quad (9)$$

where
$p_j^{syn}(\vec{x}, t)$ is a synthetic seismic data at the observation point $\vec{x}$ and time t in the synthetic medium; and
$S_j(\vec{x}, t)$ is a source wavefield at the observation point $\vec{x}$ and time t in the synthetic medium.

An acoustic wave propagates in a medium by compressing and decompressing the medium such that a small volume of the material oscillates in the direction the acoustic wave is traveling. The synthetic pressure wavefield $p_j^{synth}(\vec{x}, t)$ is the pressure wavefield at the observation point $\vec{x}$ in the medium at time t and is uniquely determined by the acoustic wave equation in Equation (9). The source wavefield $S_j(\vec{x}, t)$ is the source wavefield generated by the source 104 and may be obtained from near-field pressure measurements recorded using hydrophones located near the source 104 at the time the source 104 is activated or by modeling of the source array. Forward modeling with Equation (9) in block 603 may be performed with a finite differencing method, a pseudo-spectral method, a pseudo-analytic method, finite-element method, spectral-element method, or a finite-volume method to obtain the synthetic pressure wavefield $p_j^{syn}(\vec{x}, t)$ 611 at each receiver location $\vec{x}^r$ in the subterranean formation. The synthetic pressure wavefield obtained using forward modeling is a function of the velocity model, the vector reflectivity model, and the source wavefield:

$$p_j^{syn}(\vec{x}^r,t) = F(V_j, \vec{R}_j, S(\vec{x}^r,t)) \quad (10)$$

where F represents a forward modeling operator.

In certain implementations, the source 104 may be regarded as a point source represented as follows:

$$S(\vec{x}^r,t) = \delta(\vec{x}^r - \vec{x}^s)S(t) \quad (11)$$

where S(t) is a source-time function.

In this case, the synthetic pressure wavefield obtained using forward modeling is a function of the velocity model, the reflectivity model, and the source-time function:

$$p_j^{syn}(\vec{x}^r,t) = F(V_j, \vec{R}_j, S(t)) \quad (12)$$

In block 604, a residual may be computed for each receiver coordinate and time sample as follows:

$$r_j(\vec{x}_n^r,t_k) = p_j^{synth}(\vec{x}_n^r,t_k) - p(\vec{x}_n^r,t_k) \quad (13)$$

where n=1, . . . , N is receiver index; and k=1, . . . , M is a time sample index.

The residual $r_j(\vec{x}_n^r, t)$ is a difference between the trace of synthetic seismic data $p_j^{syn}(\vec{x}_n^r, t)$ and the trace of recorded pressure wavefield $p(\vec{x}_n^r, t)$ for each of the N receivers and for each time sample. In block 605, a residual magnitude is computed for the j-th iteration as follows:

$$\phi_j = \sum_{n=1}^{N} \sum_{k=1}^{M} \|r_j(\vec{x}_n^r, t_k)\|^2 \quad (14)$$

where $\| \|^2$ is an L2 norm.

Iterative FWI as represented in FIG. 6 stops when the residual magnitude satisfies the following condition $$\phi_j < \varepsilon \quad (15)$$

where $\varepsilon$ is a residual magnitude threshold.

The output 610 comprises the final velocity model $V_f$, which is the j-th velocity model $V_j$, and the final reflectivity $\vec{R}_f$, which is the j-th final reflectivity $\vec{R}_j$.

In block 606, adjoint migration is performed using Equation (9) in reverse time with the source term replaced by the superposition of the residual wavefield determined at each receiver location in Equation (13) as follows:

$$\left[\frac{\partial^2}{\partial t^2} - V_j(\vec{x})\vec{\nabla} \cdot (V_j(\vec{x})\vec{\nabla}) + 2V_j^2(\vec{x})(\vec{R}_j(\vec{x}) \cdot \vec{\nabla})\right]Q_j(\vec{x}, T-t) = \quad (16)$$

-continued $$\sum_{n=1}^{N} r_j(\vec{x}_n^r, T-t)$$

where $Q_j(\vec{x}, T-t)$ is the back-propagated residual wavefield; and

T is the maximum recording time for the pressure wavefield.

In block 607, an inverse scattering imaging condition ("ISIC⁻") kernel velocity is computed by $$K_V^j(\vec{x}) = \frac{1}{2I(\vec{x})} \left\{ \frac{1}{V_j^2(\vec{x})} \sum_t W_1(\vec{x}, t) \frac{\partial p_j^{syn}(\vec{x}, t)}{\partial t} \frac{\partial Q_j(\vec{x}, t)}{\partial t} \Delta t - \sum_t W_2(\vec{x}, t) \vec{\nabla} p_j^{syn}(\vec{x}, t) \cdot \vec{\nabla} Q_j(\vec{x}, t) \Delta t \right\} \quad (17)$$

where $\Delta t$ is the sampling rate;

$I(\vec{x})$ is an illumination term;

$Q(\vec{x}, t)$ is a migrated residual wavefield; and $W_1(\vec{x}, t)$ and $W_2(\vec{x}, t)$ are velocity dynamic weights.

The ISIC⁻ kernel velocity can substantially reduce or eliminate short-wavelength components of the velocity gradient and enhance macro velocity features. In Equation (17), the migrated residual wavefield $Q(\vec{x}, t)$ is obtained by time reversing the back propagated residual wavefield. The illumination term is $I(\vec{x}) = \Sigma_t^T |S(\vec{x}, t)|^2 \Delta t$ at each point $\vec{x}$. The dynamic weights are designed to optimally suppress the large- or small-scale components of the property updates in each case. The velocity dynamic weights are computed by minimization as follows:

$$W_1(\vec{x}, t) = \min_r \left\{ -rV_j^2(x)\vec{\nabla} p_j^{syn}(\vec{x}, t) \cdot \vec{\nabla} Q(\vec{x}, t) + (1-r)\frac{\partial p_j^{syn}(\vec{x}, t)}{\partial t} \frac{\partial Q_j(\vec{x}, t)}{\partial t} \right\}$$

$$W_2(\vec{x}, t) = 1 - W_1(\vec{x}, t)$$

where r is a trial weight and $0 \leq r \leq 1$.

In block 608, the seismic velocity at each observation point in the velocity model $V_j$ is updated as follows:

$$V_{j+1}(\vec{x}) = V_j(\vec{x}) + d_v K_V^j(\vec{x}) \quad (18)$$

where $d_v$ is a constant called "velocity step length."

In block 609, the reflectivity model $\vec{R}_j$ may be updated by mapping the reflectivity model to a new reflectivity model $\vec{R}_{j+1}$ based on the updated velocity model $V_{j+1}$ obtained in block 608. In block 609, the reflectivity model $\vec{R}_j$ is converted to time coordinates using the velocity model $V_j$ followed by a time to depth conversion using the updated velocity model $V_{j+1}$. The time to depth conversion may be performed trace by trace or by applying post-stack de-migration of the reflectivity $\vec{R}_j$ using the velocity model from iteration $V_j$ followed by a post-stack migration using the updated velocity model $V_{j+1}$. The ISIC⁻ kernel velocity in Equation 17 enhances updates of long-wavelength components of the velocity model $V_j$, which cannot be achieved with a velocity gradient obtained using conventional FWI. Once long-wavelength components of the velocity model $V_j$ are updated with improved accuracy in later FWI iterations, a conventional FWI gradient may be used to correctly position short-wavelength features of the velocity model $V_j$, thereby further increasing resolution of the updated velocity model $V_{j+1}$ output from block 608

Figure 8:
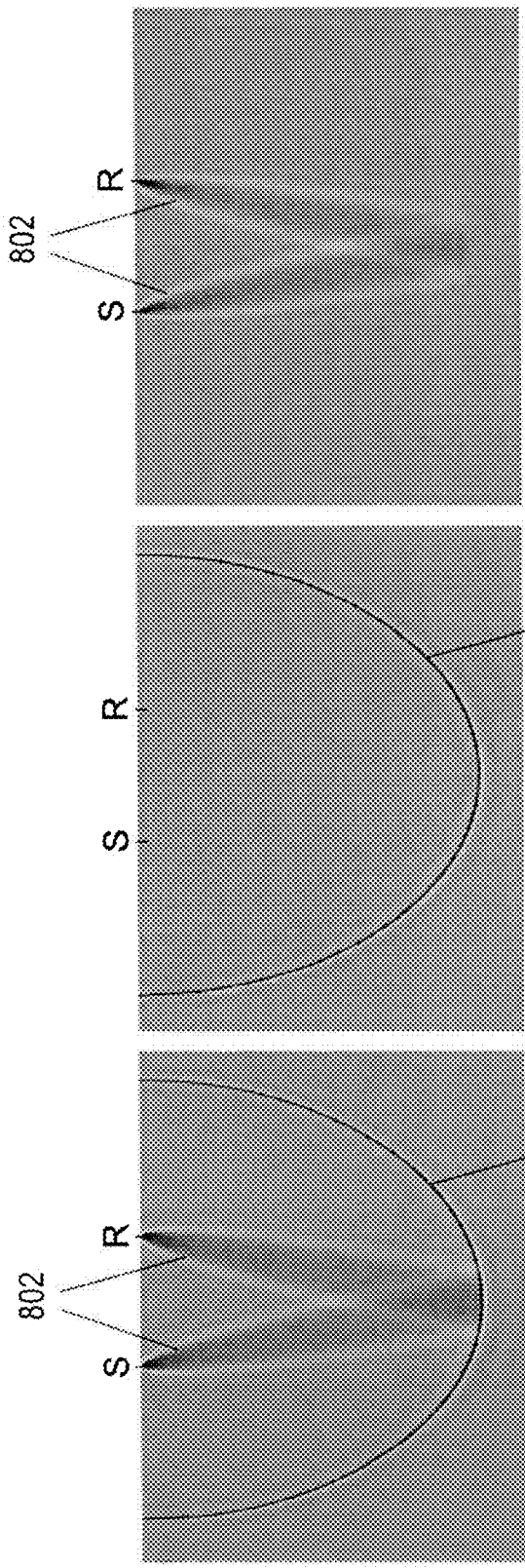
FIGS. 8A-8C shows plots of cross-correlation, inverse scattering imaging condition ("ISIC") kernel impedance, and ISIC kernel velocity.

FIG. 8A shows a plot of a conventional cross-correlation kernel produced for a model consisting of a single homogeneous layer overlying a half-space. The locations of a source and a receiver are correspondingly denoted by S and R. The cross-correlation kernel includes low wavenumber (i.e., large-scale) components 802 and high wavenumber (i.e., small-scale) components 804 that are related to a wavelength $\lambda$ of an acoustic wave (i.e., $k \propto 1/\lambda$). The low wavenumber components 802 are the result of cross-correlation of the down-going wavefields and the backscattering produced by an interface. Low wavenumber components 802 correspond to low-wavenumber features of the velocity model. The high wavenumber components 804 may be referred to as a migration isochrone and correspond to specular reflections of the reflectivity model.

FIG. 8B shows a plot of ISIC kernel impedance produced with a dynamically weighted impedance sensitivity kernel for the same model as FIG. 8A. The impedance sensitivity kernel corresponds to Equation (21). The image illustrates that high wavenumber components 804 are preserved while low wavenumber components 802 are suppressed.

FIG. 8C shows a plot of ISIC$^-$ kernel velocity produced with a dynamically weighted velocity sensitivity kernel for the same model as FIG. 8A. The kernel velocity corresponds to Equation (17a). The image illustrates that high wavenumber components 804 present in FIG. 8A are suppressed while the low wavenumber components 802 are preserved.

Returning to FIG. 5, in block 507, the final velocity model $V_f$ and final reflectivity model $\bar{R}_f$ may be used to identify compositions of the various features and layers within the subterranean formation. For example, the final velocity model $V_f$ and the final reflectivity model $\bar{R}_f$ may be used to identify deposits such as natural gas and water, and identify the different types of rock, porous materials, and sediments in the layers of the subterranean formation. Reflectivity model $\bar{R}_f$ provides shape information of the different interfaces of subterranean formations and may be a strong indication of the potential structures that may be reservoirs of oil and natural gas. The velocity model may also be used to determine the pressure within a petroleum deposit, which enables petroleum engineers to reduce the risks and hazards of drilling into a high-pressure petroleum deposit.

Least-square reverse time migration described in the next subsection below may be applied to the recorded pressure wavefield using the velocity model obtained in block 608 to improve resolution of a reflectivity model of the subterranean formation. The image or reflectivity model of the subterranean formation may be displayed on a monitor or other display device to provide a visual representation of structures and features of the subterranean formation. The image of the subterranean formation may be a two-dimensional visual representation of a cross section of the subterranean formation. Alternatively, the image of the subterranean formation may be a three-dimensional visual representation of the subterranean formation.

Building a Reflectivity Model of a Subterranean Formation with Least-Squares Reverse Time Migration in the Data Space Reverse time migration ("RTM") is a preferred migration method for modeling and imaging seismic data in subterranean formations that produce complex seismic wave phenomena because RTM is able to handle combinations of structural dip with high velocity contrasts, which are conditions common in salt basins and other geologic basins with complex structures and velocity distributions. However, even with an accurate velocity model of the subterranean formation, RTM alone still produces an approximation of the true reflectivity of the subterranean formation. In addition, RTM alone does not compensate for limitations associated with seismic data acquisition and variable acoustic illumination under complex overburden, such as salts or carbonates. By contrast, least-squares RTM ("LSRTM") overcomes problems that RTM or other conventional migration methods are not able to resolve and produces images with fewer artefacts, higher resolution, and more accurate amplitudes than conventional migration methods. In particular, LSRTM performs imaging as an inverse problem with an updated reflectivity model, thereby resulting in an image of a subterranean formation that is closer to the actual reflectivity of the subterranean formation.

Figure 9:
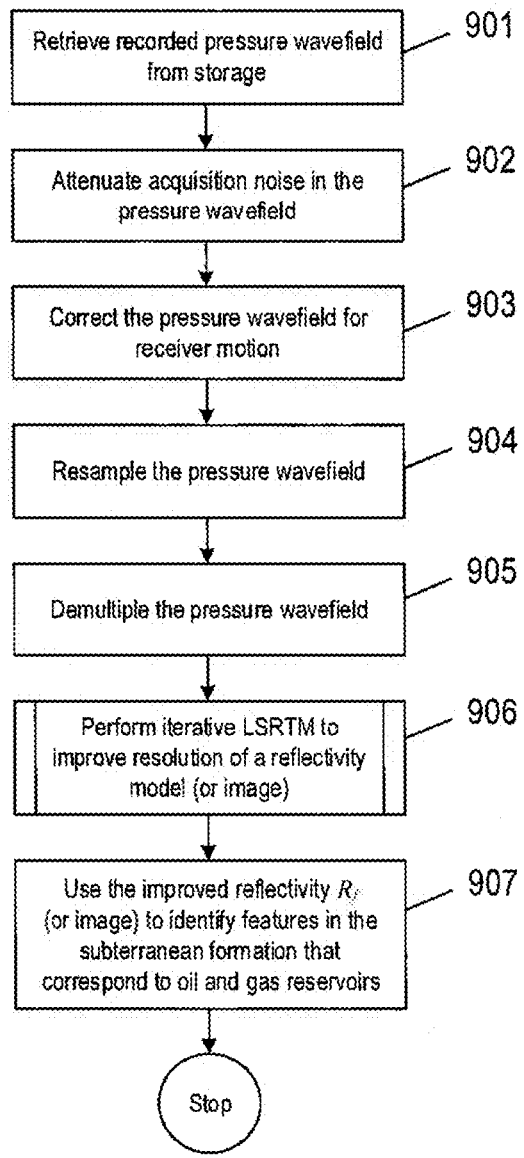
FIG. 9 shows a process for building vector reflectivity models of subterranean formation from a pressure wavefield recorded in a marine seismic survey of the subterranean formation using least-square reverse time migration ("LSRTM") according to an example implementation.

FIG. 9 shows a process for building a reflectivity model of subterranean formation from a pressure wavefield recorded in a marine seismic survey of the subterranean formation using LSRTM. Each block represents a different module of computer implemented machine-readable instructions stored in one or more data-storage devices and executed using one or more processors of a computer system. Building the vector reflectivity model may include additional modules or certain modules may be omitted or executed in a different ordering, depending on how the recorded seismic data is collected, conditions under which the recorded seismic data is collected, and depth of the body of water above the subterranean formation.

In FIG. 9, blocks 901-905 perform the same preconditioning operations represented by blocks 501-505 as described above with reference to FIG. 5. In block 906, a "perform iterative least-square reverse time migration ("LSRTM") to improve resolution of a reflectivity model of a subterranean formation" procedure is performed. An example implementation of the "perform iterative LSRTM to improve resolution of a reflectivity model of a subterranean formation" procedure is described below with reference to FIG. 10.

Figure 10:
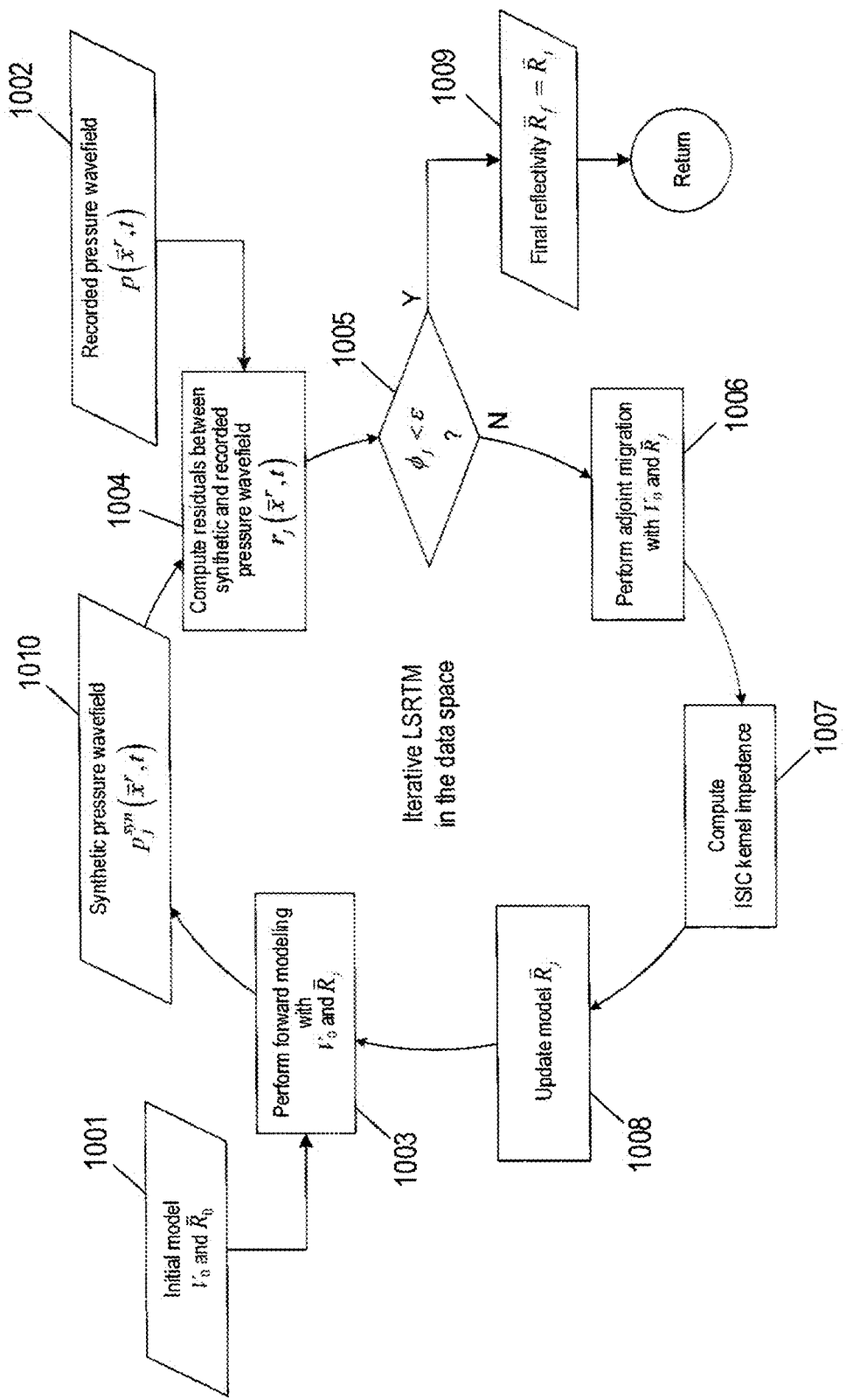
FIG. 10 shows is a flow diagram illustrating an example implementation of the "perform iterative LSRTM in the data space to build a reflectivity model $\vec{R}_f$ of the subterranean formation" procedure referenced in FIG. 9.

FIG. 10 is a flow diagram illustrating an example implementation of the "perform iterative LSRTM to improve resolution of a reflectivity model of a subterranean formation" procedure referenced in block 906 of FIG. 9. In the example of FIG. 10, the procedure is performed in the data domain. The data domain comprises time, shot coordinate locations, and receiver coordinate locations (i.e., t, $\vec{x}^s$, $\vec{x}^r$). In block 1001, an initial velocity model $V_0$, and an initial reflectivity model $\bar{R}_0$ are received as input. The initial velocity model $V_0$ and the initial reflectivity model $\bar{R}_0$ may be simple approximations of seismic velocities and reflectivity of the subterranean formation as described above with reference to FIG. 7. In block 1002, traces of the recorded pressure wavefield $p(\vec{x}^r, t)$ are received as input. Iterative LSRTM is executed in computational operations represented by blocks 1003-1008. Each iteration of iterative LSTRM begins with block 1003. Forward modeling is performed in block 1003 to compute the synthetic wavefield in block 1010 and consequently the traces of synthetic pressure data at the receiver locations, denoted by $p_j^{syn}(\vec{x}^r, t)$. The forward modeling is based on the initial velocity model $V_0$ and the j-th reflectivity model $\bar{R}_j$ updated in block 1008. Note that in the inversion procedure, for each iteration, the reflectivity model is updated while the velocity model is not updated.

Forward modeling is performed with Equation (7) based on the novel parameterization to determine a synthetic pressure wavefield $p_j^{syn}(\vec{x}, t)$:

$$\left[\frac{\partial^2}{\partial t^2} - V_0(\vec{x})\vec{\nabla} \cdot (V_0(\vec{x})\vec{\nabla}) + 2V_0^2(\vec{x})(\vec{R}_j(\vec{x}) \cdot \vec{\nabla})\right] p_j^{syn}(\vec{x}, t) = S_j(\vec{x}, t) \qquad (19)$$

The source wavefield $S_j(\vec{x}, t)$ is the source wavefield generated by the source 104 and may be obtained from near-field pressure measurements recorded using hydrophones located near the source 104 or may be computed from modeling as described above with reference to FIG. 6. Forward modeling with Equation (19) in block 1003 may be performed with a finite differencing method, a pseudo-analytic method, a pseudo-spectral method, a finite-element method, spectral-element method, or a finite-volume method to obtain the synthetic pressure wavefield $p_j^{syn}(\vec{x}^r, t)$ in block 1010 at each receiver coordinate location $\vec{x}^r$ the subterranean formation. In block 1004, a residual is computed for each receiver coordinate and time sample as described above with reference to Equation (13). In block 1005, a residual magnitude is computed for the j-th iteration using Equation (14). Iterative LSRTM stops when the residual magnitude satisfies the condition in Equation (15). In block 1006, adjoint migration is performed using Equation (19) in reverse time, in which the source term is given by the superposition of the residual wavefield determined at each receiver location as described in Equation (13):

$$\left[\frac{\partial^2}{\partial t^2} - V_0(\vec{x})\vec{\nabla} \cdot (V_0(\vec{x})\vec{\nabla}) + 2V_0^2(\vec{x})(\vec{R}_j(\vec{x}) \cdot \vec{\nabla})\right] Q_j(\vec{x}, T-t) = \qquad (20)$$

$$\sum_{n=1}^{N} r_j(\vec{x}_n^r, T-t)$$

In block 1007, an ISIC impedance kernel impedance is computed by $$K_Z^j(\vec{x}) = \frac{1}{2I(\vec{x})}\left\{\frac{1}{V_0^2(\vec{x})}W_3(\vec{x}, t)\frac{\partial p_j^{syn}(\vec{x}, t)}{\partial t}\frac{\partial Q_j(\vec{x}, t)}{\partial t} + \right. \qquad (21)$$

$$\left. W_4(\vec{x}, t)\vec{\nabla} p_j^{syn}(\vec{x}, t) \cdot \vec{\nabla} Q_j(\vec{x}, t)\right\}$$

where impedance dynamic weights $W_3(\vec{x}, t)$ and $W_4(\vec{x}, t)$ are computed as follows:

$W_3(\vec{x}, t) =$ $\min_r \left\{ rV_j^2(x)\vec{\nabla} p_i^{syn}(\vec{x}, t) \cdot \vec{\nabla} Q_j(\vec{x}, t) + (1-r)\frac{\partial p_i^{syn}(\vec{x}, t)}{\partial t}\frac{\partial Q_j(\vec{x}, t)}{\partial t}\right\}$ $W_4(\vec{x}, t) = 1 - W_3(\vec{x}, t)$ In block 1008, the reflectivity estimation at each observation point in the vector reflectivity model $\vec{R}_j$ is updated by $$\vec{R}_{j+1}(\vec{R}) = \vec{x}_j(\vec{x}) + d_p \vec{\nabla} \log K_Z^j(\vec{x}) \qquad (22)$$

where $d_p$ is the corresponding "reflectivity step length."

Returning to FIG. 9, in block 907, the final reflectivity model $\vec{R}_f$ may be used to identify compositions of the various features and layers within the subterranean formation. In particular, the final reflectivity model $\vec{R}_f$ may be used to identify subsurface structures that may contain deposits such as, for example, oil and natural gas, water, and different types of rocks.

Building a Reflectivity Model of a Subterranean Formation with Least-Squares Reverse Time Migration in the Image Space LSRTM in the image domain is used to improve the resolution and amplitude fidelity of an image of a subterranean formation. The acoustic wave equation in Equation (7) may be used to compute a synthetic pressure wavefield from a velocity model and a reflectivity model containing point diffractors. The synthetic pressure wavefield is migrated using forward modeling to construct a model point spread function ("PSF") for an image of the subterranean formation. The model PSF contains a degree of blurring of the image and may contain factors that contribute to degradation of the image. The model PSF is deconvolved from the image to obtain a corrected image of the subterranean formation with increased resolution of reflection events, interfaces, layers, and other features displayed in the image.

Figure 11:
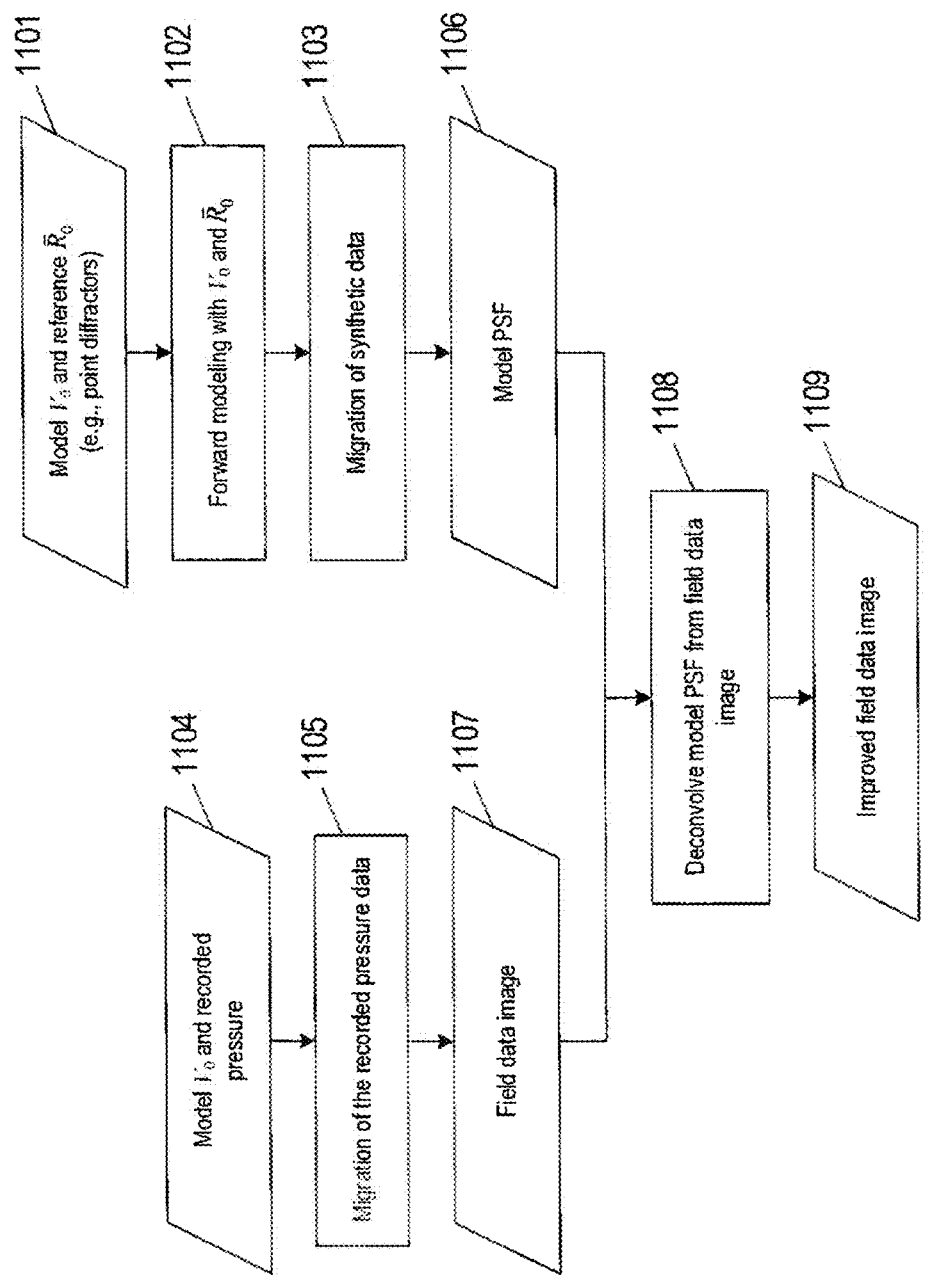
FIG. 11 is a flow diagram of a method of "LSRTM in the image space for increasing resolution of a seismic image."

FIG. 11 is a flow diagram of a method for increasing resolution of an image of a subterranean formation in the image domain. Block 1101 represents a velocity model $V_0$ and a reflectivity model $\vec{R}_0$ with point diffractors. In block 1102, forward modeling is performed with Equation (7) to determine a synthetic pressure wavefield $p^{syn}(\vec{x}, t)$:

$$\left[\frac{\partial^2}{\partial t^2} - V_0(\vec{x})\vec{\nabla} \cdot (V_0(\vec{x})\vec{\nabla}) + 2V_0^2(\vec{x})(\vec{R}_0(\vec{x}) \cdot \vec{\nabla})\right] p^{syn}(\vec{x}, t) = S(\vec{x}, t) \qquad (23)$$

where $S(\vec{x}, t)$ is a source wavefield at the observation point $\vec{x}$ and time t in the synthetic medium as described above with reference to Equations (9) and (11).

In block 1103, the synthetic pressure wavefield is used to construct a model PSF 1106 using RTM based on Equations 19 to 21, except that the ISIC impedance kernel in Equation (21) is transformed from the space-time domain to space frequency domain using a Fourier transform. As a result, the resulting model PSF, $Q_{PSF}(\vec{x}, \omega)$, in block 1106 is constructed for individual frequencies rather than for a frequency bandwidth in the time domain. The model PSF is a superposition of images computed for individual frequencies. This is done for performing deconvolution in the space-frequency domain. In block 1104, the recorded pressure wavefield and velocity model $V_0$ are received as input. In block 1105, RTM is applied to the recorded pressure wavefield and velocity model 1104 to obtain a field data image $Im(\vec{x}, \omega w)$ 1107 of a subterranean formation using the same procedure for individual frequencies as performed in block 1103. In block 1108, a corrected image of the subterranean formation is obtained by deconvolving the model PSF $Q_{PSF}(\vec{x}, \omega)$ from the image $Im(\vec{x}, \omega)$:

$$Im_{cor}(\vec{x}) = \sum_{\omega} Im(\vec{x}, \omega)/(Q_{PSF}(\vec{x}, \omega) + \varepsilon) \qquad (24)$$

where $\varepsilon$ is a non-zero stabilization constant.

By deconvolving the model PSF $Q_{PSF}(\vec{x}, \omega)$ from the field data image $Im(\vec{x}, \omega)$ in block 1108, the blurring and degradation are removed from the field data image to obtain a corrected image $Im_{cor}(\vec{x})$ 1109. The resulting corrected image has improved representation of reflectivity in the subterranean formations, has enhanced resolution, and is corrected for illumination effects.

Figure 12:
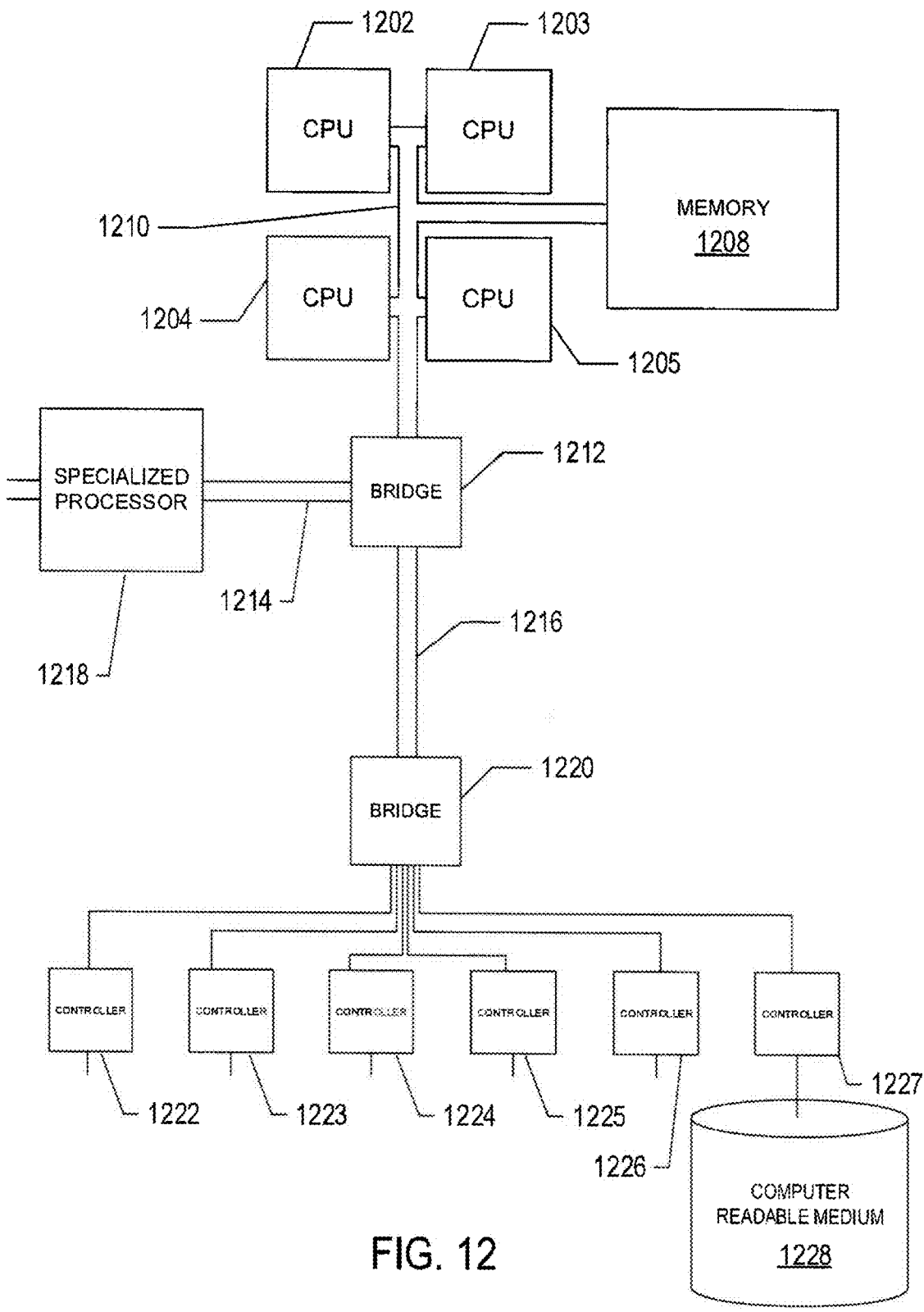
FIG. 12 shows an example of a computer system that executes an efficient process for performing a method of generating a velocity model, a vector reflectivity, and an image of a subterranean formation.

FIG. 12 shows an example of a computer system that executes an efficient process for generating a velocity model and therefore represents a geophysical-analysis system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1202-1205, one or more electronic memories 1208 interconnected with the CPUs by a CPU/memory-subsystem bus 1210 or multiple busses, a first bridge 1212 that interconnects the CPU/memory-subsystem bus 1210 with additional busses 1214 and 1216, or other types of high-speed interconnection media, including multiple, high-speed serial interconnects. The busses or serial interconnections, in turn, connect the CPUs and memory with specialized processors, such as a graphics processor 1218, and with one or more additional bridges 1220, which are interconnected with high-speed serial links or with multiple controllers 1222-1227, such as controller 1227, that provide access to various different types of computer-readable media, such as computer-readable medium 1228, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1228 is a data-storage device and may include, for example, electronic memory, optical or magnetic disk drive, USB drive, flash memory and other such data-storage devices. The computer-readable medium 1228 can be used to store machine-readable instructions that encode the computational processes described above and can be used to store encoded data, during store operations, and from which encoded data can be retrieved, during read operations, by computer systems, data-storage systems, and peripheral devices.

FIG. 13B shows two gathers, 1301 and 1304, of actual seismic data that was recorded in a marine survey of a subterranean formation. FIG. 13A shows two synthetic gathers, 1302 and 1305, simulated by using the proposed acoustic wave equation (7) and velocity and reflectivity models of the subterranean formation as described above. FIG. 13C shows two synthetic gathers, 1303 and 1306, of seismic data that were simulated using a traditional acoustic wave equation with a constant density model of the subterranean formation. Gathers 1302 and 1305 better match those corresponding to the field data, in gathers 1301 and 1304, rather than those using the traditional acoustic wave equation. The reflection events enclosed by the circle in the gather 1306 reveals that the simulated seismic data obtained using the traditional acoustic wave equation with the constant density model only faintly displays the reflection events enclosed by the circle in the gather 1304. By contrast, the reflection events enclosed by the circle in the gather 1305 reveals that the simulated seismic data obtained using the acoustic wave equation in Equation (7) closely matches the reflection events enclosed by the circle in the gather 1304.

The processes and systems disclosed herein may be used to form a geophysical data product indicative of certain properties of a subterranean formation. The geophysical data product may be manufactured by using the processes and systems described herein to generate geophysical data and storing the geophysical data in the computer readable medium 1228. The geophysical data product may include geophysical data such as pressure wavefield data, particle motion data, particle velocity data, particle acceleration data, upgoing and downgoing pressure wavefield data, velocity models, reflectivity models, of a subterranean formation computed from using the processes and systems described herein. The geophysical data product may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a computer implemented process for determining properties of a subterranean formation located beneath a body of water using a pressure wavefield recorded during a marine survey of the subterranean formation, the improvement comprising:
   determining a velocity model and a reflectivity model of the subterranean formation based on the recorded pressure wavefield and using a parameterization of an acoustic wave equation that models acoustic wavefields and depends on velocities and reflectivity of materials within the subterranean formation; and
   using the velocity model and the reflectivity model to identify properties of features in the subterranean formation.

2. The process of claim 1 wherein determining the velocity model and the reflectivity model of the subterranean formation comprises iteratively determining the velocity model and the reflectivity model of the subterranean formation based on the pressure wavefield, the acoustic wave equation, an initial velocity model, and an initial reflectivity model.

3. The process of claim 1 wherein determining the velocity model and the reflectivity model of the subterranean formation comprises:
   providing a velocity model of the subterranean formation;
   providing a reflectivity model of the subterranean formation; and
   iteratively performing,
      forward modeling a synthetic pressure wavefield based on the recorded pressure wavefield, the acoustic wave equation, the velocity model, and the reflectivity model,
      determining a residual between the synthetic pressure wavefield and the recorded pressure wavefield,
      using the acoustic wave equation to perform adjoint migration and obtain a migrated residual wavefield based on the residual and a back propagated residual wavefield, determining an inverse scattering imaging condition ("ISIC") kernel velocity based on the synthetic pressure wavefield and the back-propagated residual wavefield, updating the velocity model based on the ISIC kernel velocity and the velocity model, updating the reflectivity model based on the velocity model, and outputting the velocity model and the reflectivity model when the residual is less than a residual magnitude threshold.

4. The process of claim 1 wherein determining the velocity model and the reflectivity model of the subterranean formation comprises parameterizing the acoustic wave equation in terms of velocity and reflectivity.

5. The process of claim 1 wherein using the velocity model and the reflectivity model to identify properties of features in the subterranean formation comprises:

computing an image of the subterranean formation based on the velocity model and the recorded pressure wavefield; and displaying at least one of the image, the velocity model, and the reflectivity model on a display device, thereby revealing properties of the subterranean formation.

6. A computer system for generating an image of a subterranean formation from a pressure wavefield recorded in a marine seismic survey of the subterranean formation, the system comprising:

one or more processors;

one or more data-storage devices; and machine-readable instructions stored in the one or more data-storage devices that when executed using the one or more processors controls the system to perform operations comprising:

determining a velocity model and a reflectivity model of the subterranean formation based the recorded pressure wavefield and using a parameterization of an acoustic wave equation that models acoustic wavefields and depends on velocities and reflectivity of materials within the subterranean formation;

determining an image of the subterranean formation based on the velocity model and the pressure wavefield; and displaying the image on a display device.

7. The computer system of claim 6 wherein determining the velocity model of the subterranean formation comprises iteratively determining the velocity model and the reflectivity model of the subterranean formation based on the pressure wavefield, the acoustic wave equation, an initial velocity model, and an initial reflectivity model.

8. The computer system of claim 6 wherein determining the velocity model of the subterranean formation comprises:

providing a velocity model of the subterranean formation;

providing a reflectivity model of the subterranean formation; and iteratively updating the velocity model and reflectivity model of the subterranean formation by forward modeling a synthetic pressure wavefield based on the recorded pressure wavefield, the acoustic wave equation, the velocity model, and the reflectivity model, determining a residual between the synthetic pressure wavefield and the recorded pressure wavefield, using the acoustic wave equation to perform adjoint migration and obtain a migrated residual wavefield based on the residual and a back propagated residual wavefield, determining an inverse scattering imaging condition ("ISIC") kernel velocity based on the synthetic the recorded pressure wavefield and the back propagated residual wavefield, updating the velocity model based on the ISIC kernel velocity and the velocity model, and updating the reflectivity model based on the velocity model.

9. The computer system of claim 6 wherein determining velocity and reflectivity models of the subterranean formation comprises parameterizing the acoustic wave equation in terms of velocity and reflectivity.

10. Apparatus for determining properties of a subterranean formation from a recorded pressure wavefield obtained in a marine seismic survey of the subterranean formation, the apparatus comprising:

means for determining a velocity model and a reflectivity model of the subterranean formation based on the recorded pressure wavefield and using a parameterization of an acoustic wave equation that models acoustic wavefields and depends on velocities and reflectivity of different materials within the subterranean formation;

means for determining an image of the subterranean formation based on the velocity model and the pressure wavefield; and means for displaying the image, velocity model, and reflectivity model on a display device, thereby revealing properties of the subterranean formation.

11. The apparatus of claim 10 wherein the means for determining the velocity and reflectivity models of the subterranean formation iteratively determines the velocity model and the reflectivity model of the subterranean formation based on the pressure wavefield, the acoustic wave equation, an initial velocity model, and an initial reflectivity model.

12. The apparatus of claim 10 wherein the means for determining the velocity model and the reflectivity model of the subterranean formation:

provides a velocity model of the subterranean formation;

provides a reflectivity model of the subterranean formation; and iteratively performs, forward modeling to obtain a synthetic pressure wavefield based on the recorded pressure wavefield, the acoustic wave equation, the velocity model, and the reflectivity model, determines a residual between the synthetic pressure wavefield and the recorded pressure wavefield, using the acoustic wave equation to perform adjoint migration and obtain a migrated residual wavefield based on the residual and a back propagated residual wavefield;

determines an inverse scattering imaging condition ("ISIC") kernel velocity based on synthetic pressure wavefield and the migrated residual;

determines an ISIC kernel impedance based on synthetic pressure wavefield and the migrated residual wavefield, updating the velocity model based on the ISIC kernel velocity and the velocity model, and updating the reflectivity model based on the updated velocity model.

13. The apparatus of claim 10 wherein means for determining velocity and reflectivity models of the subterranean formation parameterizes the acoustic wave equation in terms of velocity and reflectivity.

14. A non-transitory computer-readable medium encoded with machine-readable instructions for enabling one or more processors of a computer system to generate an image of a subterranean formation by performing operations comprising:
- determining a reflectivity model of the subterranean formation based on a recorded pressure wavefield and using a parametrization of an acoustic wave equation that models an acoustic wavefield and depends on velocities and reflectivity of different materials within the subterranean formation;
- determining an image of the subterranean formation based on the pressure wavefield and a velocity model; and
- using the image and the reflectivity model to identify composition and lithology of features in the subterranean formation.

15. The medium of claim 14 wherein determining the reflectivity model of the subterranean formation comprises iteratively determining the reflectivity model of the subterranean formation based on the pressure wavefield, the acoustic wave equation, a velocity model, and a reflectivity model.

16. The medium of claim 14 wherein determining the reflectivity model of the subterranean formation comprises:
- providing a velocity model of the subterranean formation;
- providing a reflectivity model of the subterranean formation;
- iteratively performing,
  - forward modeling to obtain a synthetic pressure wavefield based on the recorded pressure wavefield, the acoustic wave equation, the velocity model, and the reflectivity model,
  - determining a residual between the synthetic pressure wavefield and the recorded pressure wavefield,
  - performing adjoint migration using the residual and the acoustic wave equation to obtain a migrated residual wavefield,
  - determining an ISIC kernel impedance based on the synthetic forward pressure wavefield and the migrated residual, and
  - updating the reflectivity model based on the ISIC kernel impedance.

17. The medium of claim 14 wherein determining the reflectivity model of the subterranean formation comprises parameterizing the acoustic wave equation in terms of velocity and reflectivity.

18. A method of manufacturing a geophysical data product, the method comprising:
- determining a velocity model and a reflectivity model of the subterranean formation based on a recorded pressure wavefield and using a parameterization of an acoustic wave equation that models acoustic wavefields and depends on velocities and reflectivity of materials within the subterranean formation;
- computing an image of the subterranean formation based on the velocity model and the recorded pressure wavefield; and
- storing the image, velocity model, and reflectivity model in a data computer readable medium.

\* \* \* \* \*